United States Patent
Iwamoto

(10) Patent No.: US 8,212,659 B2
(45) Date of Patent: Jul. 3, 2012

(54) DRIVING ASSIST DEVICE FOR VEHICLE

(75) Inventor: Taro Iwamoto, Kanagawa (JP)

(73) Assignee: Mazda Motor Corporation (JP)

( * ) Notice: Subject to any disclaimer, the term of this patent is extended or adjusted under 35 U.S.C. 154(b) by 575 days.

(21) Appl. No.: 12/489,054

(22) Filed: Jun. 22, 2009

(65) Prior Publication Data

US 2010/0060441 A1     Mar. 11, 2010

(30) Foreign Application Priority Data

Sep. 5, 2008  (JP) ................... 2008-228682
Sep. 5, 2008  (JP) ................... 2008-228683

(51) Int. Cl.
*B60Q 1/00* (2006.01)
*G08G 1/16* (2006.01)
*B60T 7/16* (2006.01)

(52) U.S. Cl. ........ 340/435; 340/436; 340/460; 340/903; 340/692; 180/167; 701/301

(58) Field of Classification Search ............. 340/435
See application file for complete search history.

(56) References Cited

U.S. PATENT DOCUMENTS

| | | | |
|---|---|---|---|
| 5,450,057 | A | 9/1995 | Watanabe |
| 6,097,285 | A | 8/2000 | Curtin |
| 7,274,288 | B2 | 9/2007 | Nagata |
| 2005/0222719 | A1 | 10/2005 | Fukuro |

FOREIGN PATENT DOCUMENTS

| | | |
|---|---|---|
| EP | 1 319 962 A1 | 6/2003 |
| EP | 1 386 782 A1 | 2/2004 |
| EP | 1 710 127 A1 | 10/2006 |
| JP | H05-58219 A | 3/1993 |
| JP | 05-126948 | 5/1993 |
| JP | 2001-001851 A | 1/2001 |
| JP | 2003-19928 A | 1/2003 |
| JP | 2006-019908 A | 1/2006 |
| JP | 2006-190193 A | 7/2006 |
| JP | 2007-50724 A | 3/2007 |
| JP | 2007-312081 A | 11/2007 |
| JP | 2009-301123 A | 12/2009 |
| WO | 9833676 A1 | 8/1998 |

OTHER PUBLICATIONS

Extended European Search Report dated Oct. 7, 2009; Application No. 09010231.0-1264.

*Primary Examiner* — Donnie Crosland
(74) *Attorney, Agent, or Firm* — Studebaker & Brackett PC; Donald R. Studebaker

(57) ABSTRACT

An alarm sound according to the distance of a dangerous object exiting around a vehicle is created. A reference sound which enables a driver to recognize the distance of the dangerous object when the driver hears the alarm sound, comparing with the reference sound, is created. The alarm sound and the reference sound are generated at the same time or a different timing. It is preferable that the sound volume of the alarm sound be greater than that of the reference sound. Accordingly, the driver can be warned precisely of the distance of the dangerous object from the vehicle with the sound.

14 Claims, 21 Drawing Sheets

DRIVING ASSIST DEVICE FOR VEHICLE

BACKGROUND OF THE INVENTION

The present invention relates to a driving assist device for a vehicle.

It is desired to warn a driver of any dangerous object existing around a vehicle from the safety aspect. Japanese Patent Laid-Open Publication No. 2001-1851 discloses an example of such an alarm device, in which sound images are positioned in the direction of dangerous objects, such as other vehicles or pedestrians, by using speakers (generating sounds) so that the driver can be warned of existence of the dangerous objects (i.e., sound fields are created so that the driver can hear alarm sounds from the exiting positions of the dangerous objects). Further, U.S. Pat. No. 7,274,288 discloses a device in which the position of a virtual sound source and the kind of alarm sounds are changed according to warning contents.

Herein, it is very preferable from the safety aspect that the driver recognize (judge) the distance of the dangerous object existing around from the vehicle. Accordingly, it may be considered that the alarm sound is created according to the distance of the dangerous object. For example, the sound volume (sound pressure) of the alarm sound may be set in such a manner that the alarm sound has a greater sound volume in case the object exists closer to the vehicle.

However, it may be difficult for the human to recognize (judge) the distance from it to a sound source simply by hearing the sound emitting from the sound source. That is, changing the sound volume of the alarm sound according to the distance may not be enough for the driver to precisely recognize the distance of the dangerous object from the vehicle.

Other publications, such as Japanese Patent Laid-Open Publication Nos. 5-126948 and 2007-312081, disclose different alarm devices. These devise, however, do not provide any effective countermeasures against the above-describe problem, either.

SUMMARY OF THE INVENTION

The present invention has been devised in view of the above-described problem, and an object of the present invention is to provide a driving assist device for a vehicle which can precisely warn the driver of the distance of the dangerous object from the vehicle with the sound.

According to the present invention, there is provided a driving assist device for a vehicle which is equipped with plural speakers for a driver, comprising an object detecting means to detect an object existing around the vehicle, a danger-degree detecting means to detect a degree of danger of collision or contact of the object detected by the object detecting means with the vehicle, a direction detecting means to detect a direction of the object which has a critical state in the degree of danger of collision or contact with the vehicle which is detected by the danger-degree detecting means, a distance detecting means to detect a distance of the object existing around the vehicle from the vehicle, an alarm-sound creating means to create an alarm sound according to the distance of the object which is detected by the distance detecting means and the direction of the object which is detected by the direction detecting means, a reference sound creating means to create a reference sound which enables the driver to recognize the distance of the detected object from the vehicle when the driver hears the alarm sound created by the alarm-sound creating means, comparing with the reference sound, and a sound generating means to generate the alarm sound created by the alarm-sound creating means and the reference sound created by the reference sound creating means at the same time or a different timing via the speakers for the driver.

According to the present invention, the driver can precisely recognize the distance of the object from the vehicle based on the difference between the alarm sound and the reference sound which the driver hears. That is, while it is generally difficult for the human to recognize the distance to the sound source just by only hearing the sound emitting from the sound source, when the human hears another sound (reference sound) emitting from another sound source as well as the sound, it may be easily recognized (judged) by the human which sound source is located farther than the other by comparing two sounds. Accordingly, the driver can precisely recognize the distance of the object from the vehicle by hearing the both sounds with comparison.

According to an embodiment of the present invention, the reference sound creating means creates the reference sound based on a sound of a sound source which is located between the driver and the object. Thereby, since the reference sound is emitted from the sound source which is located near or on the side of the object, the precise recognition of the distance by the driver can be made more proper.

According to another embodiment of the present invention, the reference sound creating means creates a first reference sound based on the sound of the sound source which is located between the driver and the object, and a second reference sound based on a sound of another sound source which is located in the direction of the object and at a farther position than the object, and the sound generating means generates the alarm sound and the first and second reference sounds. Thereby, since the driver compares the alarm sound with the two reference sounds, the driver can recognize the distance of the object from the vehicle more precisely.

According to another embodiment of the present invention, the first reference sound and the second reference sound are generated by the sound generating means at a different timing from each other. Thereby, since the driver hears the reference sound showing the near location and the reference sound showing the far location at the different timing, the comparison with the alarm sound can be made easier. Accordingly, the driver's recognition of the distance to the object can be further improved.

According to another embodiment of the present invention, a sound volume of the reference sound changes according to at least one of the distance of the object from the vehicle and the alarm sound. Thereby, the driver's consciousness can be properly prevented from being directed to the sound source of the reference sound, or the difference between the alarm sound and the reference sound can be properly recognized.

According to another embodiment of the present invention, the reference sound has directional information which shows the direction of the object. Thereby, the driver's recognition of the direction of the dangerous object can be achieved promptly.

According to another embodiment of the present invention, the reference sound is created as a road-ambience sound which is stored previously or obtained through a microphone. The above-described function of the present invention can be performed properly by using the road-ambience sound which contains sufficient information of the near or far located sound sources.

According to another embodiment of the present invention, the reference sound is a composite sound which is obtained through combination of a specified reference sound and the road-ambience sound. Thereby, the reference sound can be the proper one by setting the reference sound so as to contain various kinds of information.

According to another embodiment of the present invention, a sound volume of the reference sound is lower than that of the alarm sound. Thereby, the driver's recognition of the distance to the dangerous object can be achieved properly by making the driver hear the alarm sound more clearly.

According to another embodiment of the present invention, the plural speakers comprise a pair of right and left speakers and a pair of front and rear speakers, the pair of right and left speakers being disposed on the right and on the left symmetrically relative to a driver's head with a forward-directed driver's eyes in a plan view, the pair of front and rear speakers being disposed in front and in back symmetrically relative to the driver's head with the forward-directed driver's eyes in the plan view, and the sound generating means generates the alarm sound via the pairs of speakers so that a sound image of the object is positioned in the direction of the object detected by the direction detecting means. Thereby, the sound image of the dangerous object can be precisely positioned in the direction of the object without any complex processing so that the driver can recognize the dangerous properly.

According to another embodiment of the present invention, the driving assist device further comprises a driver's-eyes-direction detecting means to detect a direction of a driver's eyes, wherein when the driver's-eyes direction detected by the driver's-eyes-direction detecting means is different from the direction of the object detected by the direction detecting means, the sound generating means generates the alarm sound via the pairs of speakers so that the sound image of the object is positioned in the driver's-eyes direction first and then the sound image of the object is moved gradually so that the sound image of the object is positioned in the direction of the object detected by the direction detecting means. Thereby, the direction of the driver's eyes can be guided to the direction of the dangerous object surely. In particular, since the positioning of the sound image is mild, this guidance of the driver's-eyes direction can be achieved smoothly without the driver's feeling improperly abrupt.

According to another embodiment of the present invention, the driving assist device further comprises a driver's-eyes-direction detecting means to detect a direction of a driver's eyes, wherein when the driver's-eyes direction detected by the driver's-eyes-direction detecting means is different from the direction of the object detected by the direction detecting means, the sound generating means generates the alarm sound via the pairs of speakers so that the sound image of the object is positioned in the direction of the object detected by the direction detecting means, while when the driver's-eyes direction is the same as the direction of the object, the sound generating means stops generating the alarm sound or turns down the alarm sound generated. Thereby, any wasteful positioning of the sound image may be avoided when the driver's-eyes direction is the same as the direction of the object. This is because the driver may have already recognized the dangerous object when the driver's-eyes direction is the same as the direction of the object.

According to another embodiment of the present invention, the driving assist device further comprises a driver's-head-direction detecting means to detect a direction of a driver's head, and a rotating means to rotate the speakers around the driver's head in the plan view, keeping relative positional relationships of the speakers, wherein the rotating means rotates the speakers so that the front speaker is positioned right in front of the driver's head detected by the driver's-head-direction detecting means. Thereby, even if the position of ears of the driver changes according to the change of the driver's-head direction changes, the plural speakers are also changed accordingly. Accordingly, the positioning of the sound image can be achieved precisely without any complex processing.

According to another embodiment of the present invention, the plural speakers are a non-directional type of flat speaker which is provided at a roof of the vehicle. It may be preferable that the plural speakers be disposed near the head portion of the driver in order to achieve the precise positioning of the sound image. Herein, since the plural speakers are the non-directional type of flat speaker, the speakers can be properly disposed by using a space above the driver's head.

Other features, aspects, and advantages of the present invention will become apparent from the following description which refers to the accompanying drawings.

DETAILED DESCRIPTION OF THE INVENTION

Figure 1:
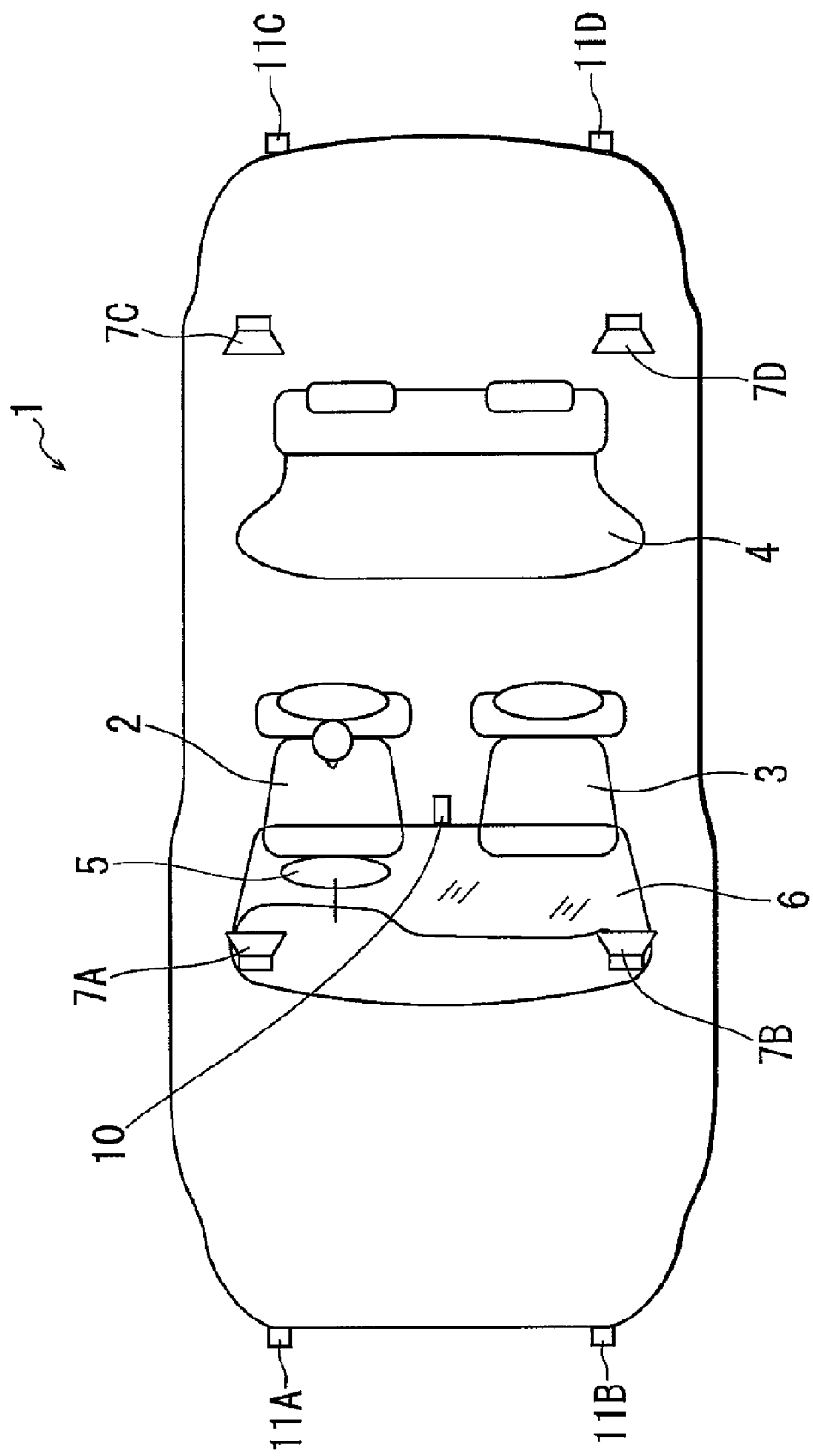
FIG. 1 is a schematic plan view showing an example of a vehicle to which the present invention is applied.

Hereinafter, preferred embodiments of the present invention will be described referring to the drawings.

Embodiment 1

In FIG. 1 showing an automotive vehicle 1 as a vehicle, reference numeral 2 denotes a driver's seat, reference numeral 3 denotes a passenger's seat (assistant's seat), reference numeral 4 denotes a rear seat, reference numeral 5 denotes a handle, and reference numeral 6 denotes a windshield (front window glass). In four corners of the vehicle are provided speakers 7A, 7B, 7C and 7D. That is, there are provided the speaker 7A at the front right, the speaker 7B at the front left, the speaker 7C at the rear right, and the speaker 7D at the rear left. Hereinafter, these speakers 7A-7D will be referred to as speakers 7 simply in case the differentiation of those is not necessary.

A camera 10 is disposed near the windshield 6 in the vehicle. The camera 10, an image pick-up means, picks up an image in front of the automotive vehicle 1 widely. Other plural cameras than the camera 10 are provided, illustration of which is omitted in FIG. 1, so that whole images around the automotive vehicle 1 can be picked up by these cameras substantially. Further, microphones 11A-11D are provided in the four corners of the vehicle 1. These microphones 11A-11D pick up a road-ambience sound as described later.

Figure 2:
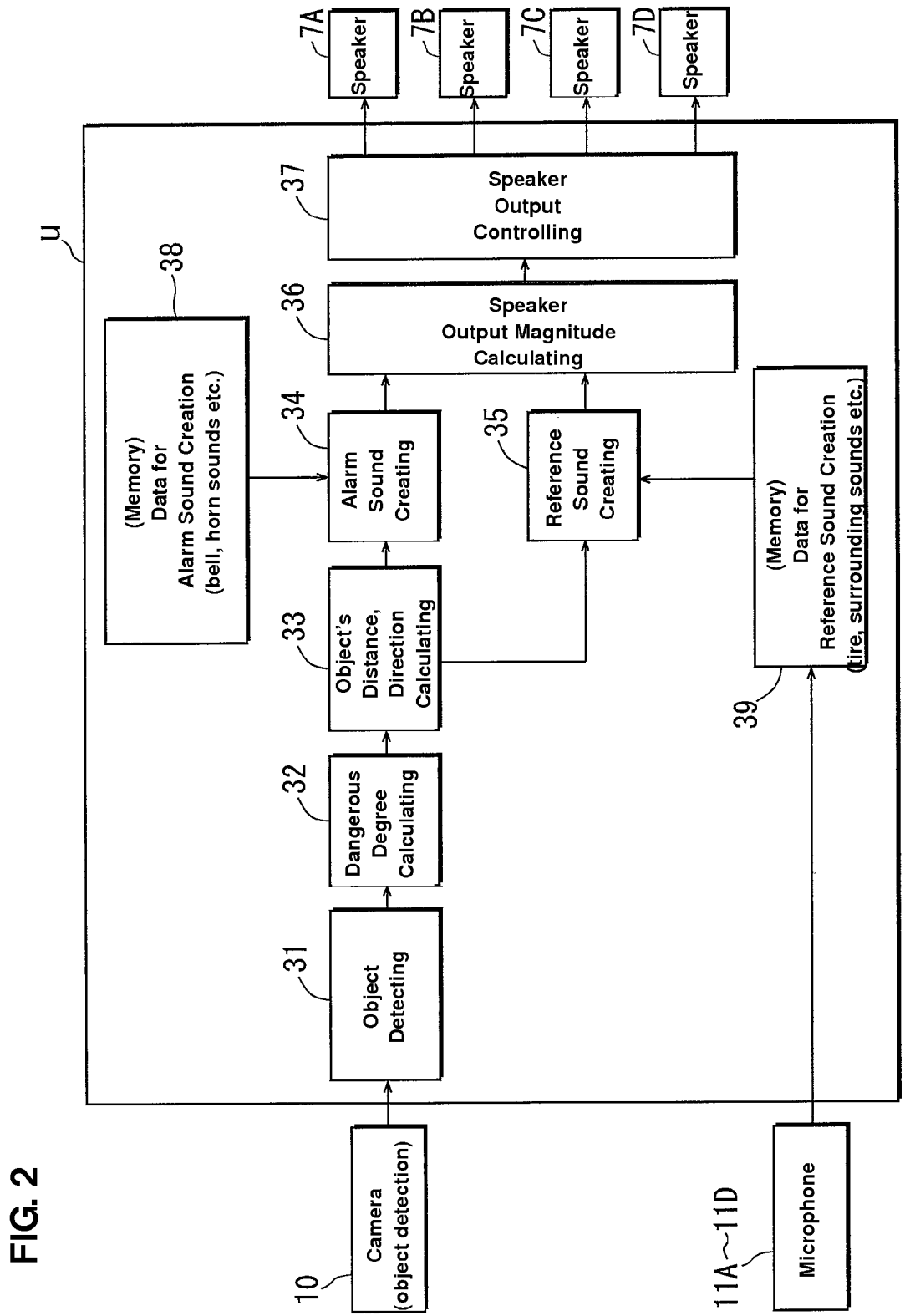
FIG. 2 is a block diagram showing a control system of the present invention.

A controller (control unit) U which is composed by a computer and provided at the automotive vehicle 1 is shown in FIG. 2. The controller U receives respective outputs from the above-described camera 10 and microphones 11 and controls the respective speakers 7.

The controller U comprises processing portions 31-37 and memory portions 38, 39 (processing functions). The processing portion 31 extracts images of another vehicle, two-wheeled vehicle or pedestrian from the image data picked up by the camera 10. This extraction of the processing portion 31 may be achieved through the image matching with previously stored image data of such objects, or the detection of location or speed of another vehicle (two-wheeled vehicle) by using the road-to-vehicle communications.

The processing portion 32 calculates (determines) the degree of danger of collision (or contact) of the object detected by the processing portion 31 with the automotive vehicle 1. This calculation is executed as follows, for example. First, the distance to the object and the relative speed are detected (while the distance and the relative speed are detected based on the change of the images picked up by the camera 10 according to the present embodiment, a distance detecting sensor and a relative-speed detecting sensor may be provided additionally). Then, it is calculated from the distance and the relative speed how long it takes for the vehicle to collide with the object. Herein, in case the time calculated is shorter, the degree of danger of collision is considered to be higher. The processing portion 33 calculates the direction and the distance of the object which has a critical state in the degree of danger of collision, that is, the object that has the highest degree of danger of collision, for example.

The memory portion 38 stores alarm sounds which enable the driver to differentiate the vehicle, two-wheeled vehicle and pedestrian from each other. For example, the alarm sound for the vehicle is "puppu" which is like a horn sound, the alarm sound for the two-wheeled vehicles is "chirin chirin" which is like a bell sound, and the alarm sound for the pedestrian is "kachi kachi" which is like a walking sound. The processing portion 34 selects a specified kind of alarm sound according to the kind of dangerous object (vehicle, two-wheeled vehicle, or pedestrian) with the direction and the distance which are calculated by the processing portion 33, and sets a specified sound volume according the distance to the dangerous object (the sound volume is set to be greater in case the dangerous object is located more closely).

The memory portion 39 stores sound data for creating the reference sound. This sound data contains a tire sound which is generated at the vehicle traveling and various road-circumference sounds (surrounding sounds which are generally generated when the vehicle travels). The processing portion 35 selects an appropriate sound from the sound data stored by the memory portion 39 according to the output of the processing portion 33 and creates the reference sound. Herein, as described later, the microphones 11A-11D are provided in the four corners in the automotive vehicle 1 (the own vehicle), and the road-ambience sounds picked up by the microphones 11A-11D are stored by the memory portion 39 as new sound data or sound data which shows the current road circumference the best.

The processing portion 36 calculates the output magnitude (sound volume) of the speakers 7A-7D based on processing results of the processing portions 34, 35. The way of setting the output magnitude of the speakers 7A-7D will be described later. The processing portion 37 makes the respective speakers 7A-7D emit the sounds so that the sounds can have the output magnitude set by the processing portion 36 (in some case, only part of these speakers may emit the sounds).

Figure 3:
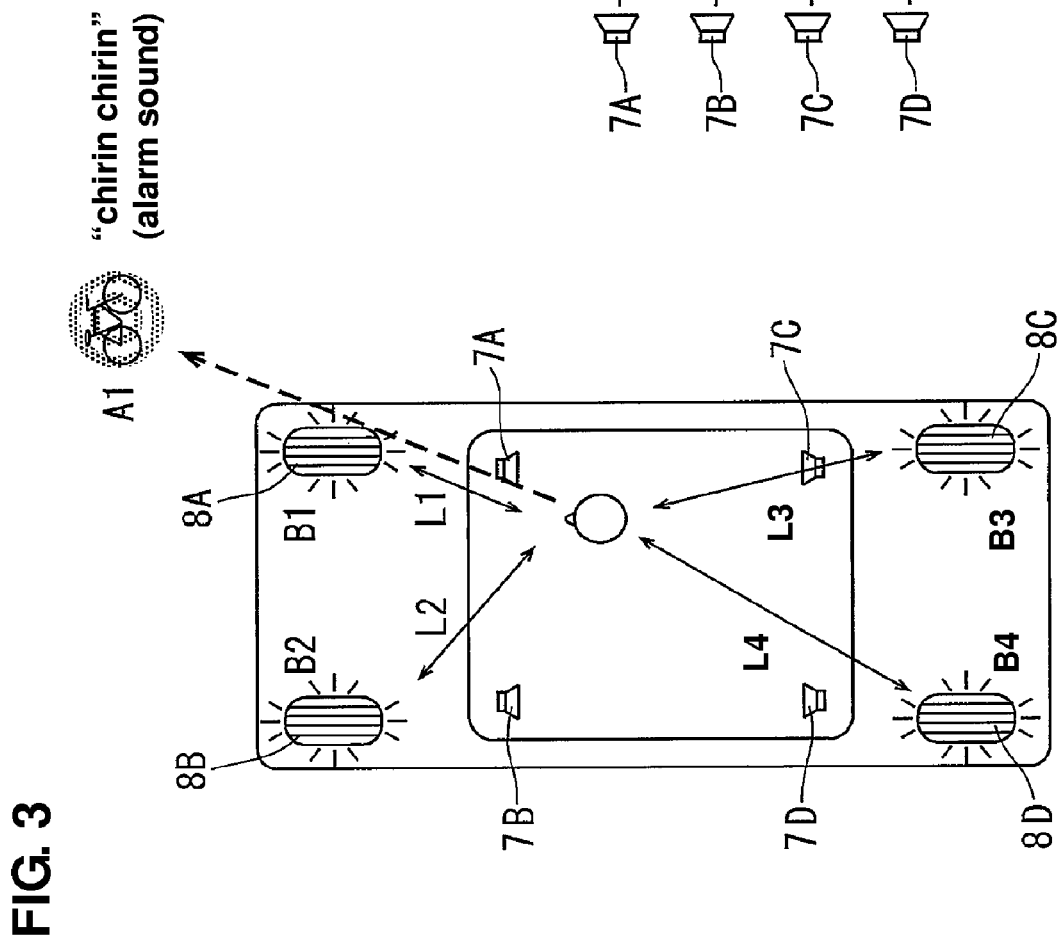
FIG. 3 is an explanatory diagram showing a first embodiment of the present invention.

FIG. 3 illustrates a case in which a two-wheeled vehicle A1 as the dangerous object exits at the front right of the automotive vehicle 1 (own vehicle). In this case, an alarm sound So ("chirin chirin" bell sound, for example) which makes the driver recognize the existence of the two-wheeled vehicle A1 is emitted from the speaker 7A which is closest to the two-wheeled vehicle A1. The sound volume of the alarm sound So is set to be greater in case the distance to the two-wheeled vehicle A1 is closer (the direction of the two-wheeled vehicle A1 can be recognized with the alarm sound So).

Reference sounds Sd of FIG. 3 are created based on tire sounds B1-B4 of four tires 8A-8D of the automotive vehicle 1, for example. The respective distances between the driver and the tires 8A-8D are denoted by reference characters L1-L4. Herein, the sound volumes of the reference sounds Sd emitted from the respective speakers are set in such a manner that the smaller the distance between the driver and the tire is, the greater the sound volume of the reference sounds Sd emitted from the speaker is. That is, the sound volume from the speaker 7A which is located near the tire 8A which is the closest to the driver (distance L1) has the greatest sound volume. The sound volume from the speaker 7B which is located near the tire 8B which is the second closest to the driver (distance L2) has the second greatest sound volume. The sound volume from the speaker 7C which is located near the tire 8C which is the third closest to the driver (distance L3) has the third greatest sound volume. The sound volume from the speaker 7D which is located near the tire 8D which is the furthest from the driver (distance L4) has the smallest sound volume.

The reference sounds Sd comprise four kinds of sounds SdA-SdD for the tire sounds (traveling sounds) B1-B4, which are emitted from the speakers 7A-7D respectively. The driver recognizes the difference between the above-described alarm sound So and these reference sounds SdA-SdD, so that the driver can precisely recognize the distance from the driver to the two-wheeled vehicle A1 intuitively. In this case, the sound volume of the alarm sound Sd is set to be properly greater than that of the reference sounds Sd (SdA-SdD) so that the driver may not miss hearing the alarm sound So. Herein, while the sound volume of the alarm sound So is set to be greater in case the distance from the driver to the two-wheeled vehicle A1 is smaller, the driver can recognize the distance to the two-wheeled vehicle A1 by comparing the alarm sound So with the reference sounds (Sd) more precisely than another case where the driver hears only the alarm sound So.

Figure 7:
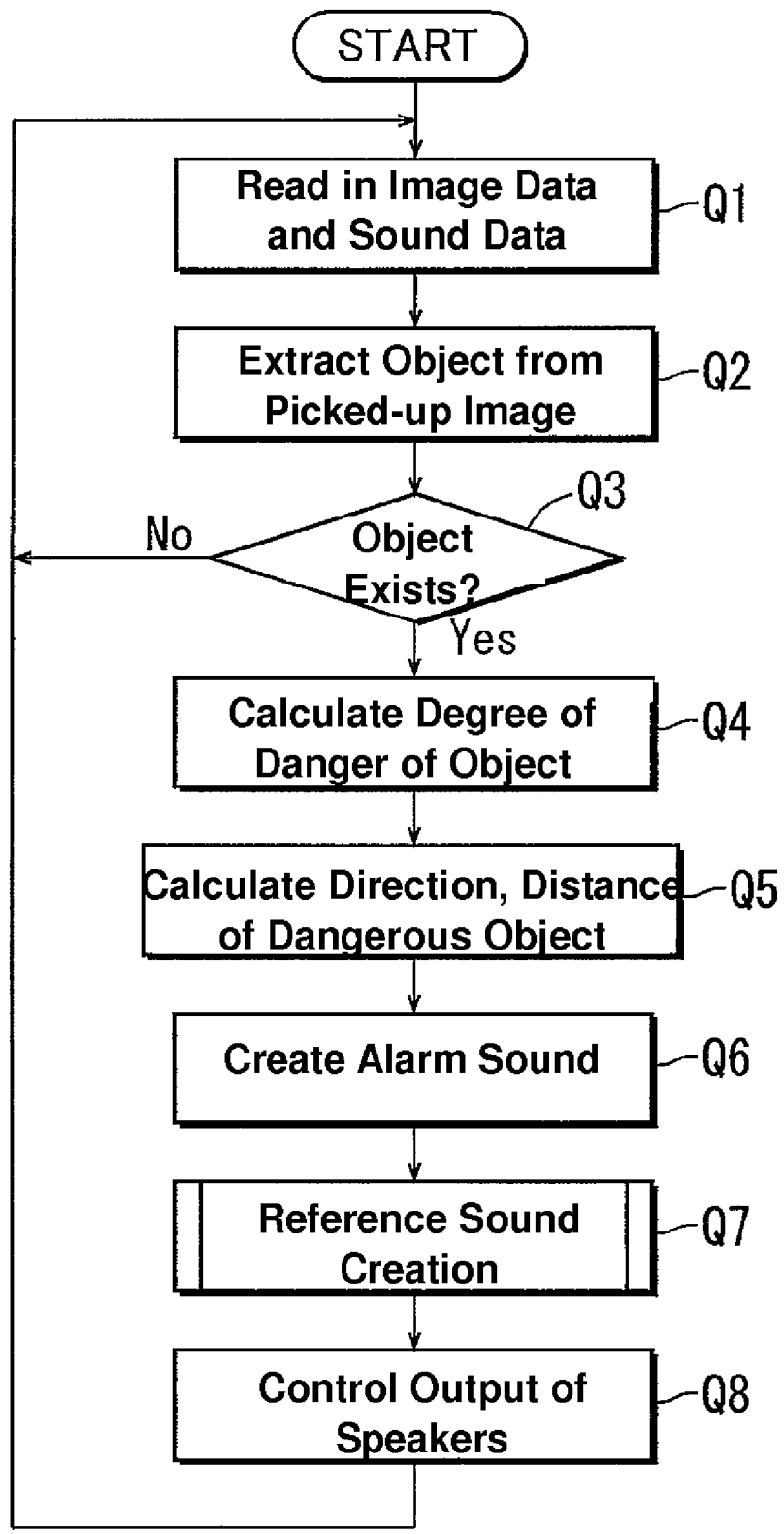
FIG. 7 is a flowchart showing a control example of the present invention which is common in the respective embodiments.
Figure 8:
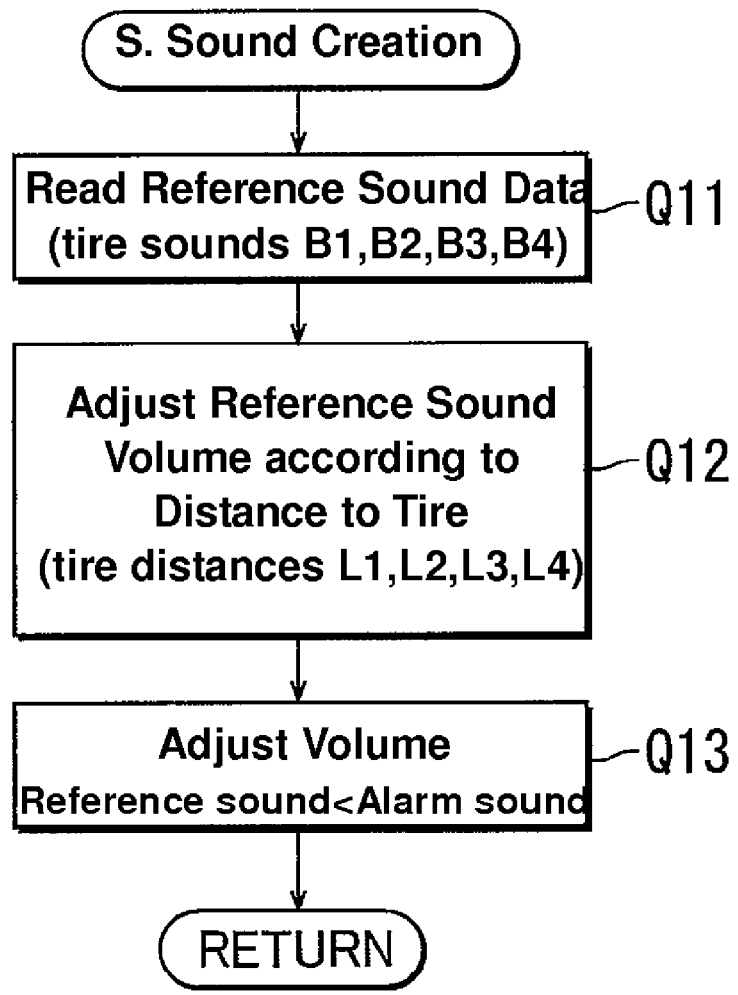
FIG. 8 is a flowchart showing a control example of the first embodiment.

FIGS. 7 and 8 are flowcharts which show specific control examples of the control shown in FIG. 3. Hereinafter, these flowcharts will be described. Reference character Q denotes each step of the control. At first, in step Q1 of FIG. 7, the image (image data) picked up by the camera 10 and the sound data from the microphones 11 are read in. Then, the object's image is extracted from the image data in step Q2. In the next step Q3, it is determined whether the dangerous exits or not. When the determination of the step Q3 is No, the control returns.

When the determination of the step Q3 is Yes, the degree of danger of the object is calculated in step Q4. Next, the direction and the distance of the dangerous object which has the critical state in the degree of danger of collision are calculated in step Q5. In the subsequent step Q6, the kind of the alarm sound So is set according to the kind of dangerous objects, the sound volume of the alarm sound So is set according to the distance to the dangerous object, and the direction of the dangerous object is set. Then, the reference sounds Sd are set in step Q7, which will be described. After this, the output control of the alarm sound So and the reference sounds Sd are executed in step Q8.

The creation of the reference sounds of the step Q7 is specifically shown in FIG. 8. In step Q11 of FIG. 8, the reference sound data (the tire sounds B1-B4) is read out in step Q11 of FIG. 8. In the next step Q12, the sound volume of the reference sounds is adjusted according to the distance between the driver and the tires 8A-8D (the closer the tire is to the driver, the greater the sound volume is). The sound volume of the reference sounds is set to be smaller than that of the alarm sound So in step Q13.

Embodiment 2

Figure 4:
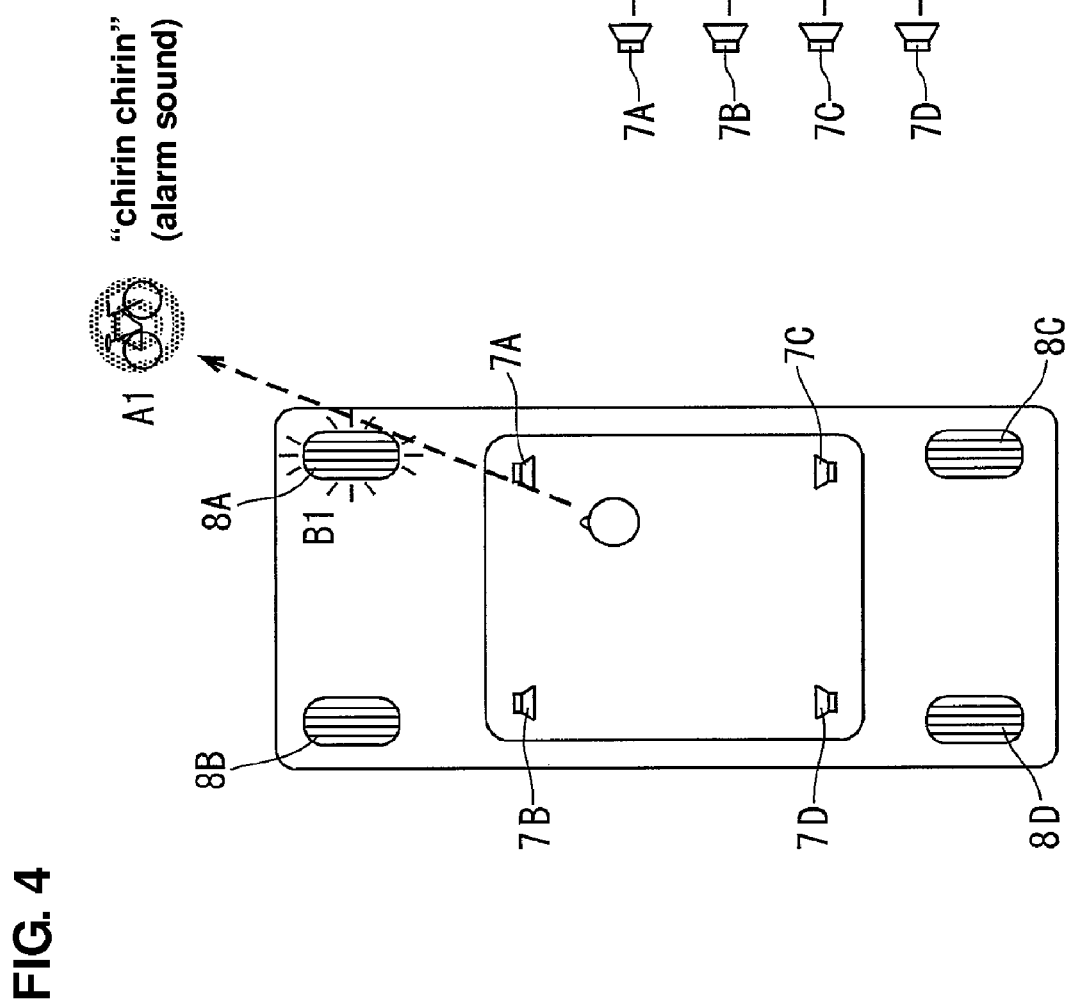
FIG. 4 is an explanatory diagram showing a second embodiment of the present invention.

FIG. 4 shows a second embodiment of the present invention. According to the present embodiment, the reference sound Sd is set in a direction which is identical to the direction of the dangerous object A1. That is, the dangerous object A1 is located in the direction of the front right tire 8A in an example shown in FIG. 4, so the reference sound Sd is only set for the tire sound B1 of the front right tire 8A in this example.

Figure 9:
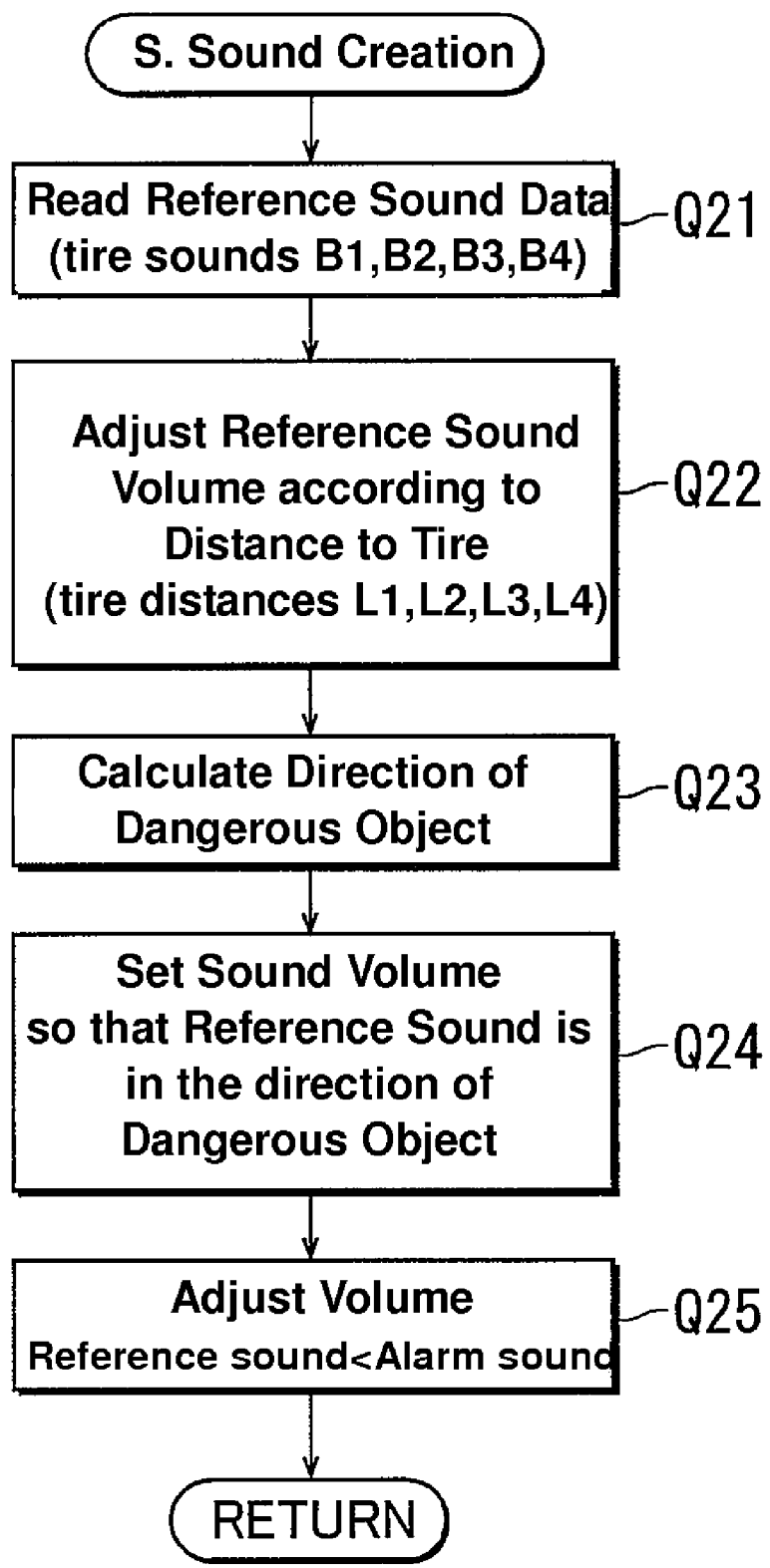
FIG. 9 is a flowchart showing a control example of the second embodiment.

A control example of the present embodiment is shown in flowcharts of FIGS. 7 and 9, and its details of the step Q7 of FIG. 7 is shown in FIG. 9. Since the flowchart shown in FIG. 7 is common in the first and second embodiments (third embodiment as well) and has been described above, its description will be omitted here. In step Q21 of FIG. 9, the data of the tire sounds B1-B4 is read out (corresponding to the step Q11 of FIG. 8). In the next step Q22, the sound volume of the reference sound is adjusted according to the distance between the driver and the tires 8A-8D (corresponding to the step Q12 of FIG. 8). Then, the existing direction of the dangerous object A1 is calculated in the next step Q23. In the next step Q24, the sound volume of the reference sounds from the speakers 7A 7D is set so that the reference sound is in the direction which is identical to the direction of the dangerous object A1. That is, only the dangerous object A1 exists in the direction of the tire 8A in the example shown in FIG. 4, the reference sound is emitted only or mainly from the speaker 7A near the tire 8A. Herein, the reference sound may be possibly emitted from plural speakers according to the direction of the dangerous object A1. Then, in step Q25 the sound volume of the reference sound is set to be smaller than that of the alarm sound So (corresponding to the step Q13 of FIG. 8).

Embodiment 3

Figure 5:
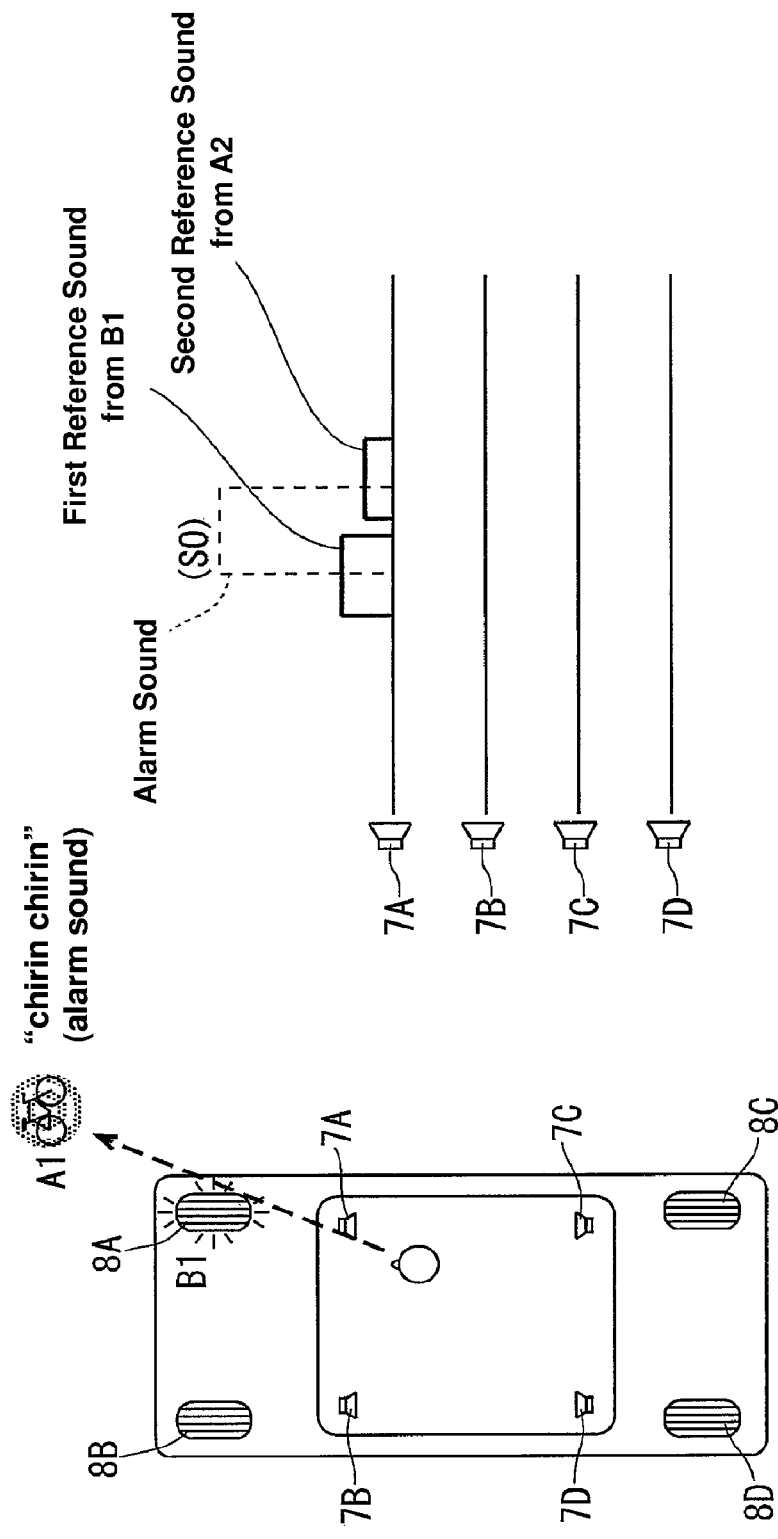
FIG. 5 is an explanatory diagram showing a third embodiment of the present invention.

FIG. 5 shows a third embodiment of the present invention. According to the present embodiment, a sound of another object A2 which is located in the direction of the dangerous object A1 and at a farther position than the dangerous object A1 is also used as the reference sound. Herein, a first reference sound based on the tire sound and a second reference sound based on another object A2 are set in the direction of the dangerous object A1 like the second embodiment. The first reference sound and the second reference sound are generated at a different timing from each other. According to the present embodiment, since the driver compares the alarm sound with two reference sounds, the first and second reference sounds, the driver can recognize the distance to the dangerous object A1 more precisely. Herein, it may be preferable that the same kind of objects (vehicle, two-wheeled vehicle or pedestrian) as the dangerous object A1 be selected as the above-described object A2 and that the kind of sound of the second reference sound be selected according to the kind of the object A2.

Figure 10:
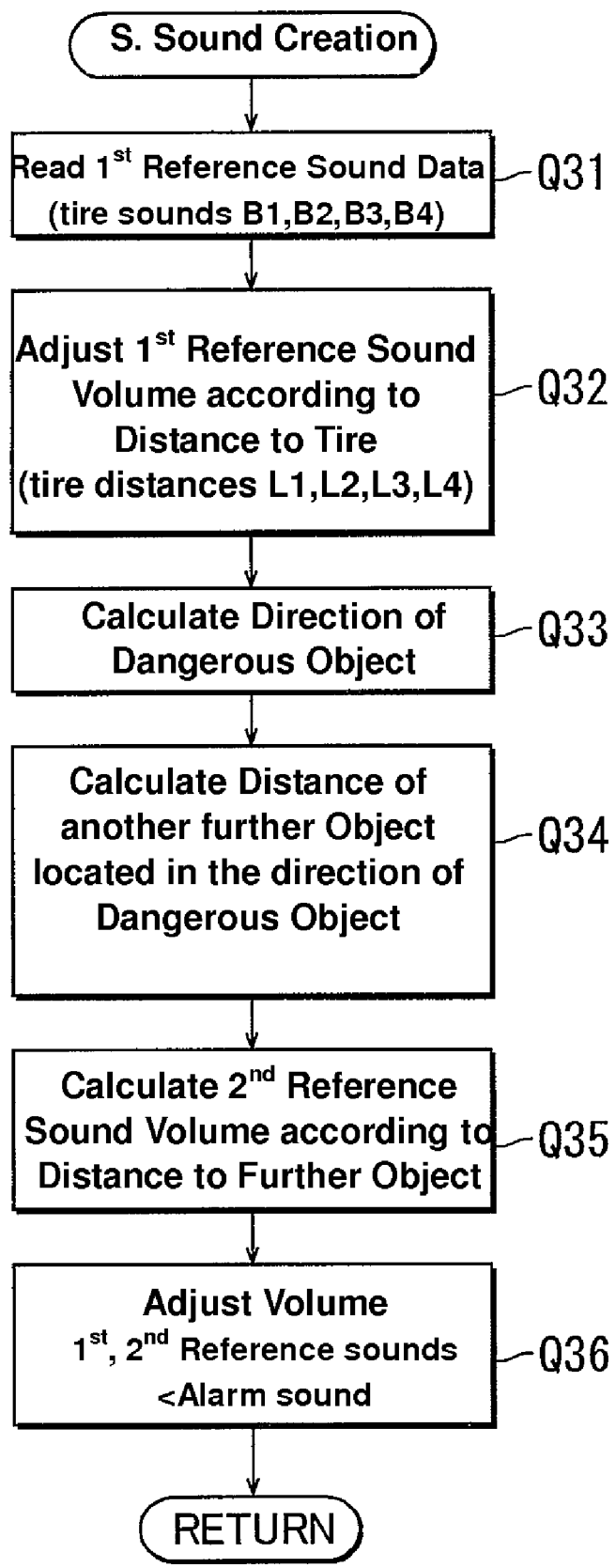
FIG. 10 is a flowchart showing a control example of the third embodiment.

FIGS. 7 and 10 are flowcharts which show a control example of the third embodiment, and its details of the step Q7 of FIG. 7 is shown in FIG. 10. The data of the tire sounds as the first reference sound are read out in step Q31 of FIG. 10 (corresponding to Q11 of FIG. 8). In the next step Q32, the sound volume of the reference sound is adjusted according to the distance between the driver and the tires (corresponding to the step Q12 of FIG. 8).

Then, the existing direction of the dangerous object A1 is calculated in the next step Q33. In the next step Q34, the distance of the object A2 which is located in the direction of the dangerous object A1 and at the further position than the dangerous object A1 is calculated. Then, in step Q35 the sound volume of the second reference sound is calculated according to the distance to the object A2. Then, in step Q36 the sound volume of the reference sounds is set to be smaller than that of the alarm sound So.

Embodiment 4

Figure 6:
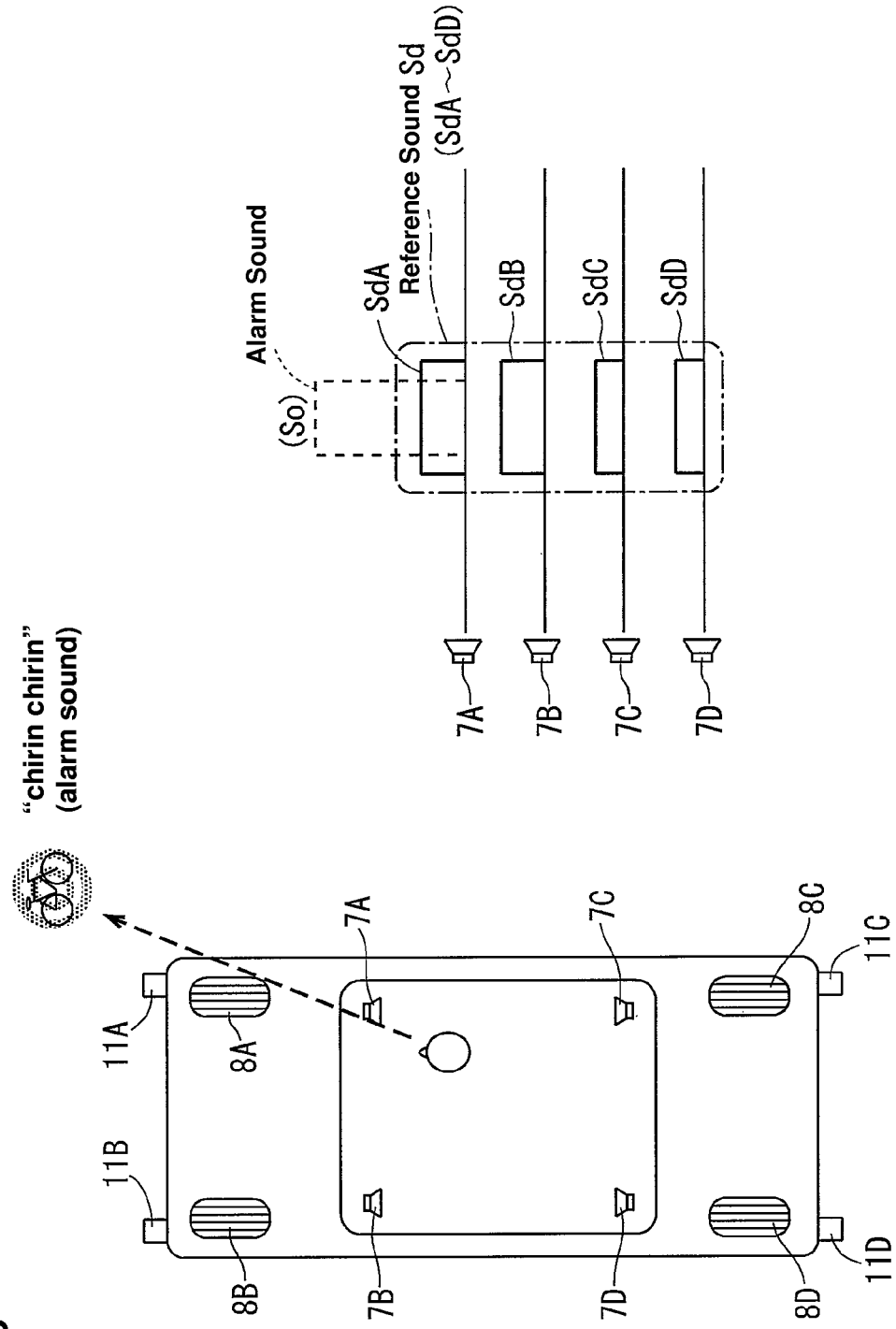
FIG. 6 is an explanatory diagram showing a fourth embodiment of the present invention.

FIG. 6 shows a fourth embodiment of the present invention. According to the present embodiment, the reference sounds are created based on road-ambience sounds which are picked up by the microphones 11 (11A-11D) in the corners of the vehicle in place of the tire sounds. This creation of the reference sounds based on the road-ambience sounds is similar to the first embodiment shown in FIG. 3. That is, the sound volume of the reference sounds is adjusted according to the distance between the driver and the microphones 11A-11D. The alarm sound So is positioned in the direction of the dangerous object A1.

Figure 11:
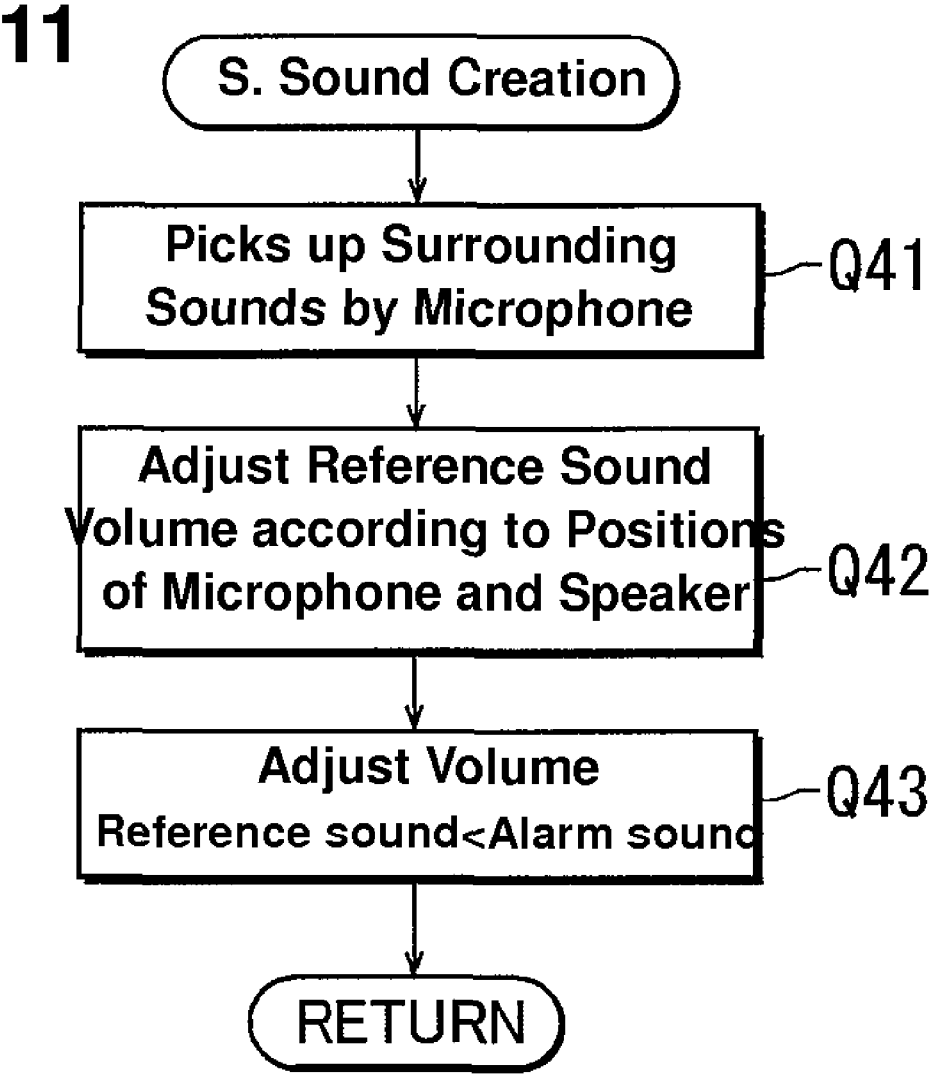
FIG. 11 is a flowchart showing a control example of the fourth embodiment.
Figure 12:
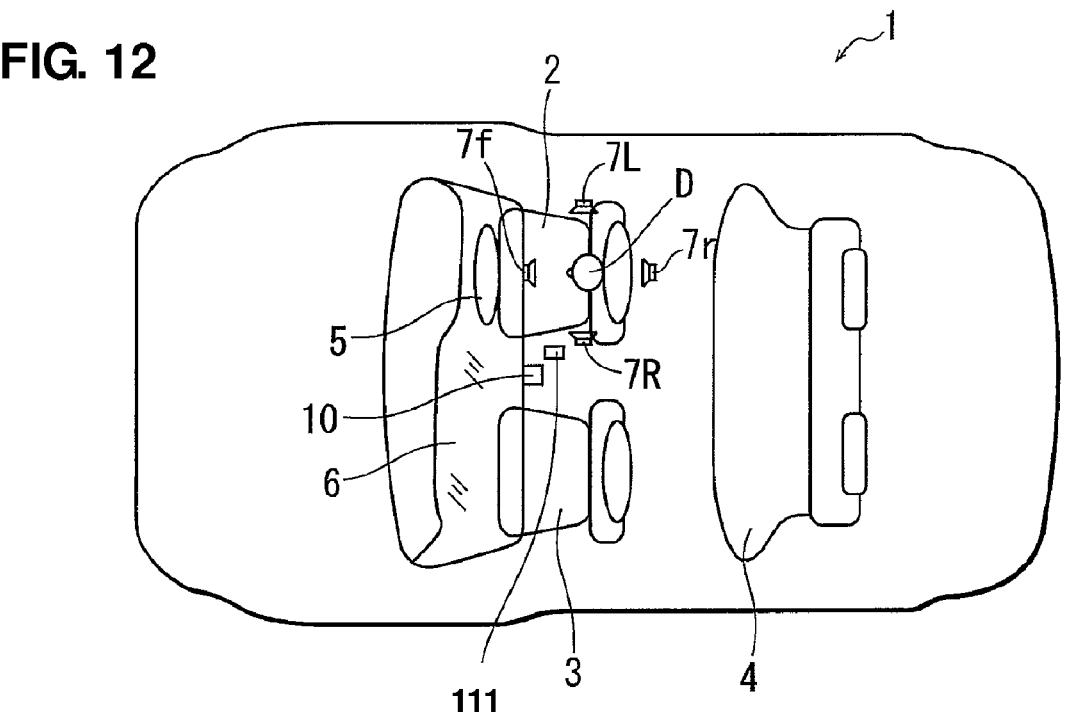
FIG. 12 is a schematic plan view showing another example of the vehicle to which the present invention is applied.

FIGS. 7 and 11 are flowcharts which show a control example of the fourth embodiment, and its details of the step Q7 of FIG. 7 is shown in FIG. 11. The road-ambience sounds are picked up by the microphones 11A-11D in step Q41 of FIG. 11. In the next step Q42, the sound volume of the reference sounds from the speakers 7A-7D is adjusted according to the distance between the driver and the microphones 11A-11D (in such a manner that the closer the microphone is to the driver, the greater the sound volume of the road-ambience sound from the speaker near that microphone is). Then, in step Q43 the sound volume of the reference sounds is set to be smaller than that of the alarm sound So.

Hereinafter, other types of embodiments in which the speakers comprise a pair of right and left speakers and a pair of front and rear speakers, will be described as fifth through seventh embodiments. Herein, the pair of right and left speakers is disposed on the right and on the left symmetrically relative to a driver's head with a forward-directed driver's eyes in a plan view, and the pair of front and rear speakers is disposed in front and in back symmetrically relative to the driver's head with the forward-directed driver's eyes in the plan view.

Embodiment 5

A fifth embodiment will be described referring to FIGS. 12 through 15. According to the present embodiment, there are provided a pair of right and left speakers 7R, 7L and a pair of front and rear speakers 7f, 7r above and near the driver's head D. The pair of right and left speakers 7L, 7R is disposed on the right and on the left symmetrically relative to the driver's head D with a forward-directed driver's eyes in a plan view, and the pair of front and rear speakers 7f, 7r is disposed in front and in back symmetrically relative to the driver's head D with the forward-directed driver's eyes in the plan view.

Figure 13:
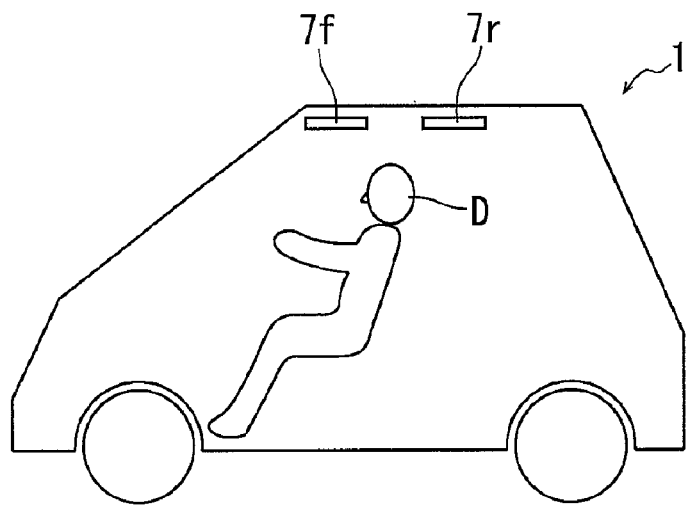
FIG. 13 is a schematic side view showing speakers which are disposed above a driver.

These speakers 7 (hereinafter, these speakers 7R, 7L, 7f, 7r will be referred to as a speaker 7 simply in case the differentiation of those is unnecessary) is the flat speaker, and they are disposed on an inner face of a vehicle roof as shown in FIG. 13. While the speakers 7 are illustrated in a dome shape in FIG. 1, this is just for showing the existence of the speakers and they have a plate shape actually. Further, while only the front and rear speakers 7f, 7r are illustrated in FIG. 13, the right and left speakers 7R, 7L are disposed along the vehicle roof. The speakers 7 may be disposed at the vehicle roof in such a manner that a sound emitting face of the speaker is located below a roof trim (not illustrated) to emit the sound into the vehicle, or that a whole part of the speaker is disposed between the roof and the roof trim so that the sound emitted from the speaker can transmit into the vehicle through the roof trim (in this case, some small through holes may be preferably formed at a specified portion the roof trim which corresponds to the speakers 7). Herein, the speakers 7 may be fixed to the roof (the inner face of the roof trim) directly or fixed to the roof trim.

In the vehicle a sensor 111 is disposed near the windshield 6 in addition to the above-described camera 10. This sensor 111 is a driver's eyes sensor to detect the direction of the driver's eyes, and it detects the driver's-eyes direction by detecting the position of the driver's pupil, for example. Herein, this senor 111 is disposed at a rearview mirror facing to the driver, but it may be configured by using a camera.

Figure 14:
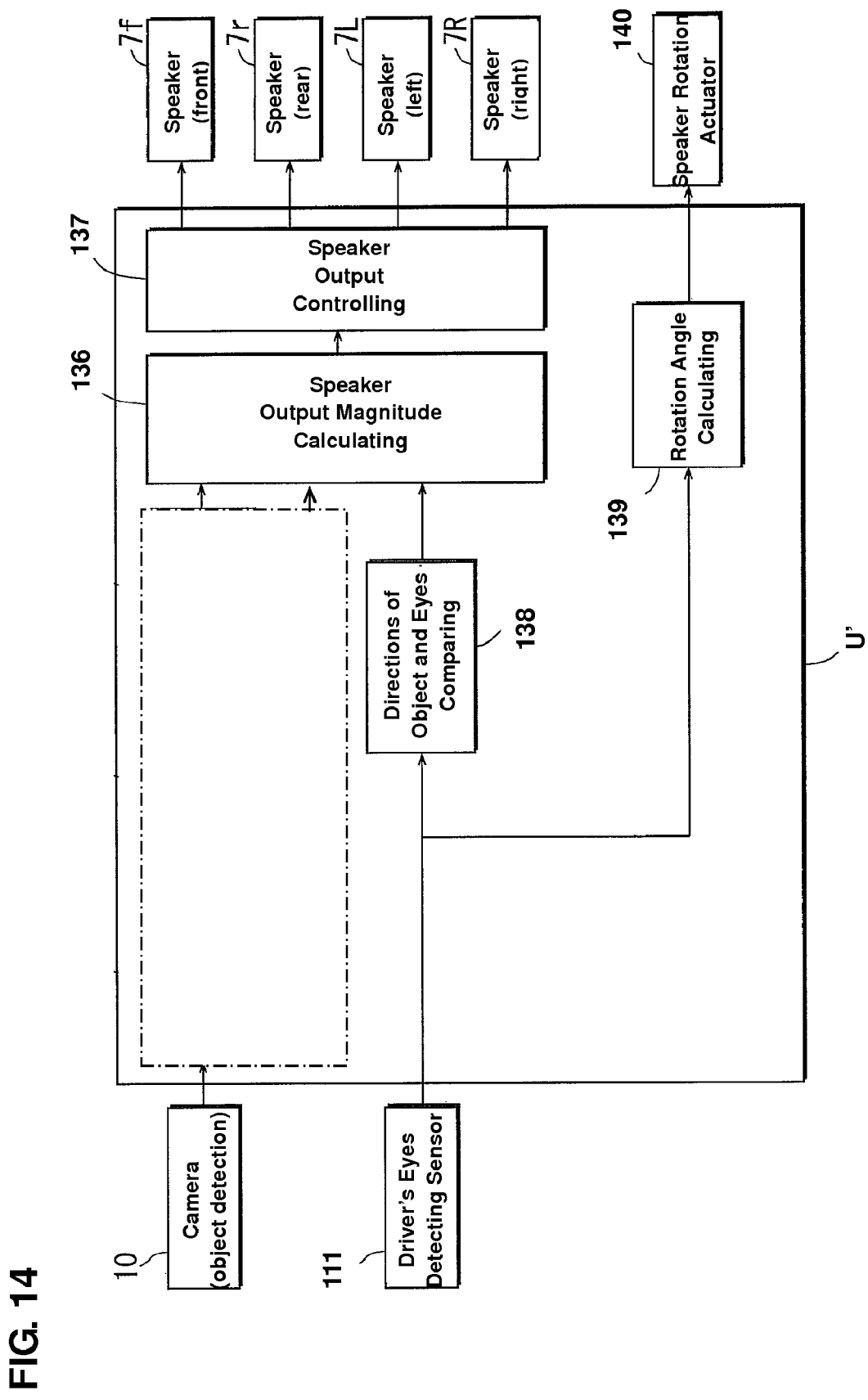
FIG. 14 is a block diagram showing another control system of the present invention.

FIG. 14 shows a controller (control unit) U' of the present embodiment. Herein, the same structure (the processing portions 31 through 35, and 38) as the controller U of the above-described first embodiment is shown by an enclosure of a one-dotted broken line, specific illustrations of which are omitted here. Further, in the following descriptions of the performance of the controller U' of the present embodiment, descriptions related to the functions of the above-described same structure will be omitted for simplicity because they have been described specifically in the above-described first embodiment. Herein, processing portions 138, 139 and an actuator 140 particularly relate to another different embodiment which will be described later, so the functions of those will be described later as well.

A processing portion 136, which receives the outputs from the processing portions 34, 35 as described above, calculates the direction of the dangerous object. A processing portion 137 positions a sound image in the direction of the dangerous object calculated by the pressing portion 136 by controlling the plural speakers 7.

The control of the sound-image positioning by the processing portion 137 will be described referring to FIG. 15. In this figure, the forward direction of the automotive vehicle 1 is denoted by "1" for example, and the front-right oblique direction is denoted by "2." Herein, the position of the direction "2" is more close to the right direction specifically. In case the dangerous object (two-wheeled vehicle in this figure) exists in the direction "1," the alarm sound is emitted only or mainly from the front speaker 7f so that the sound image can be positioned in the forward direction "1." In case the dangerous object exists in the direction "2," the alarm sound is emitted from the front speaker 7f and the right speaker 7R. Herein, the position of the direction "2" is more close to the right direction specifically as described above, the sound volume of the alarm sound of the right speaker 7R is greater than that of the front speaker 7f. Of course, in case the position of the direction "2" is more close to the front direction, the sound volume of the alarm sound of the front speaker 7f is greater than that of the right speaker 7R. In case that position is at the right middle position between the forward direction and the right direction, the both sound volumes are the same.

Figure 15:
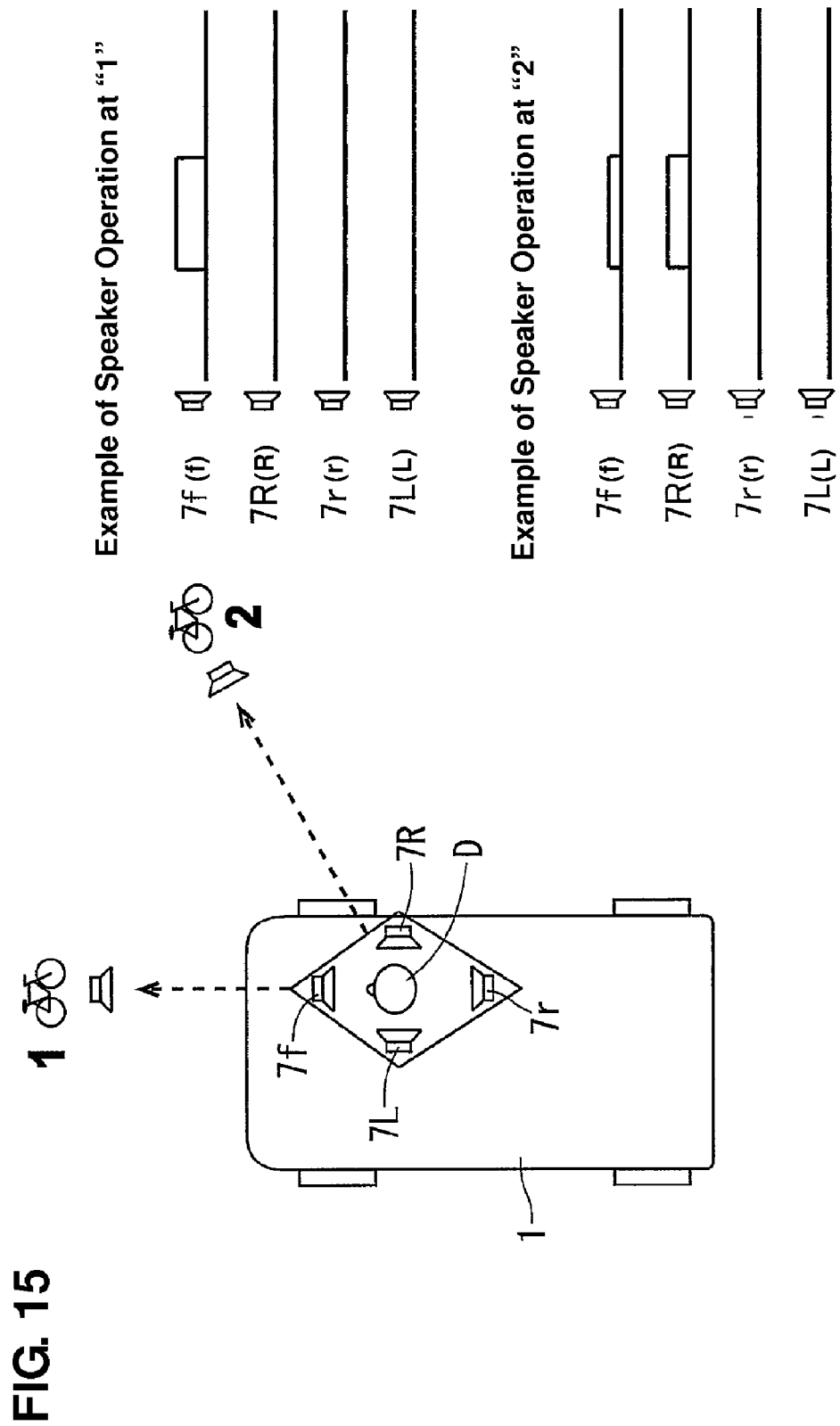
FIG. 15 is a diagram showing a speaker output state for a sound image positioning according to a fifth embodiment of the present invention.

FIG. 15 merely shows one example. Accordingly, in case the dangerous object exists right behind the automotive vehicle 1, only the rear speaker 7r emits the alarm sound. In case the dangerous object exists at the rear right relative to the vehicle, the rear and right speakers 7r, 7R emit the alarm sounds. In this case, the existing position of the dangerous object is closer to the right direction, the sound volume of the alarm sound emitted from the right speaker is greater (in case that is closer to the front direction, the sound volume will be in the reverse situation). Likewise, in case the dangerous object exists on the left of the vehicle, only the left speaker 7L emits the alarm sound. And, in case the dangerous object exists at the rear left relative to the vehicle, the rear and left speakers 7r, 7L emit the alarm sounds (the ratio of sound volume from these speakers changes according to the position of the dangerous object as described above). In case the dangerous object exists at the front left relative to the vehicle, the front and left speakers 7f, 7L emit the alarm sound (the ratio of sound volume from these speakers changes according to the position of the dangerous object in the same manner).

Since the four speakers are disposed symmetrically around the driver's head D in the plan view, the sound-image can be positioned precisely in the desired direction by adjusting the sound volume from the respective speakers 7, so that the driver can recognizes the direction of the sound image positioned properly.

Embodiment 6

Figure 16:
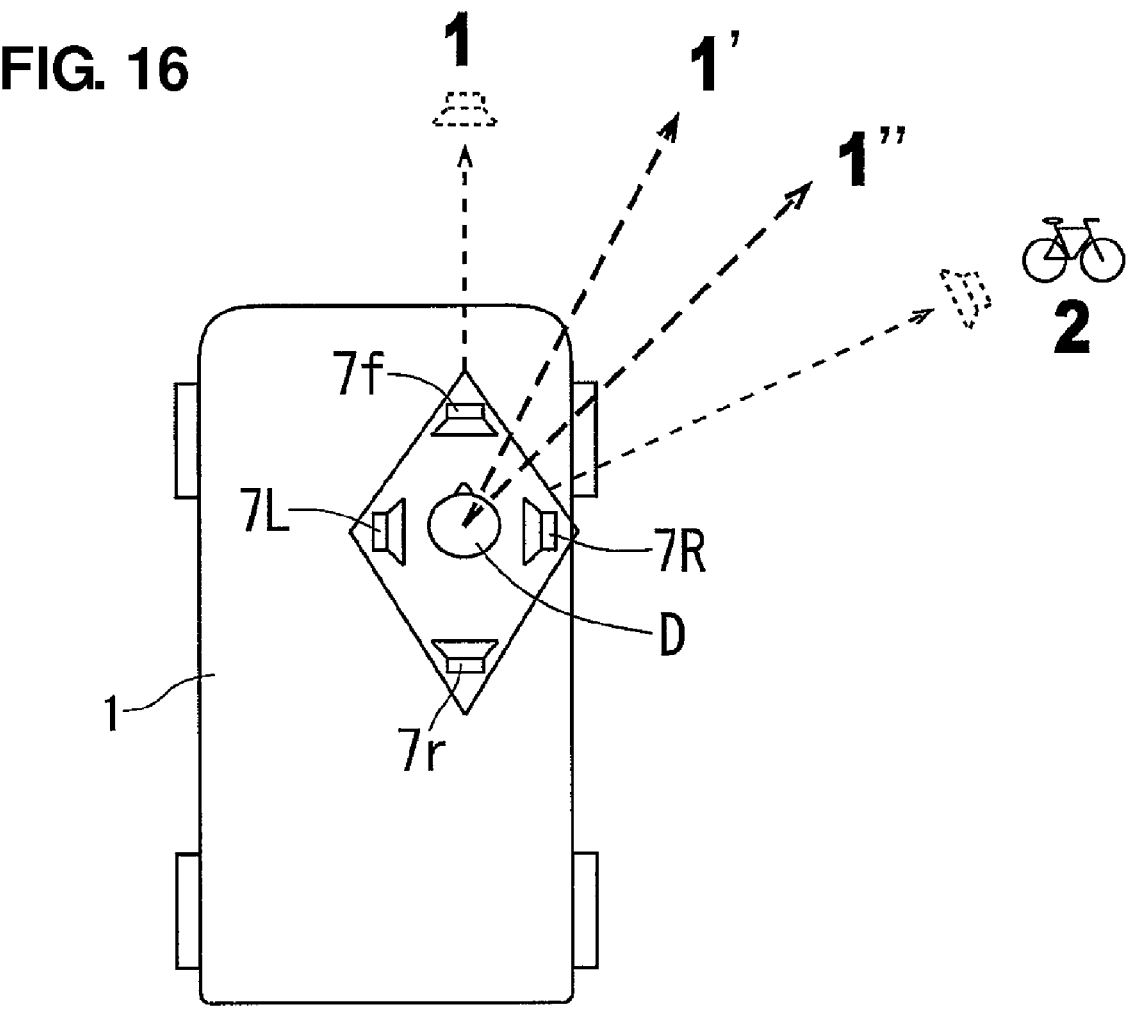
FIG. 16 is a schematic plan view showing an example of the direction of a driver's eyes and the direction of the sound image positioning according to a sixth embodiment of the present invention.
Figure 17:
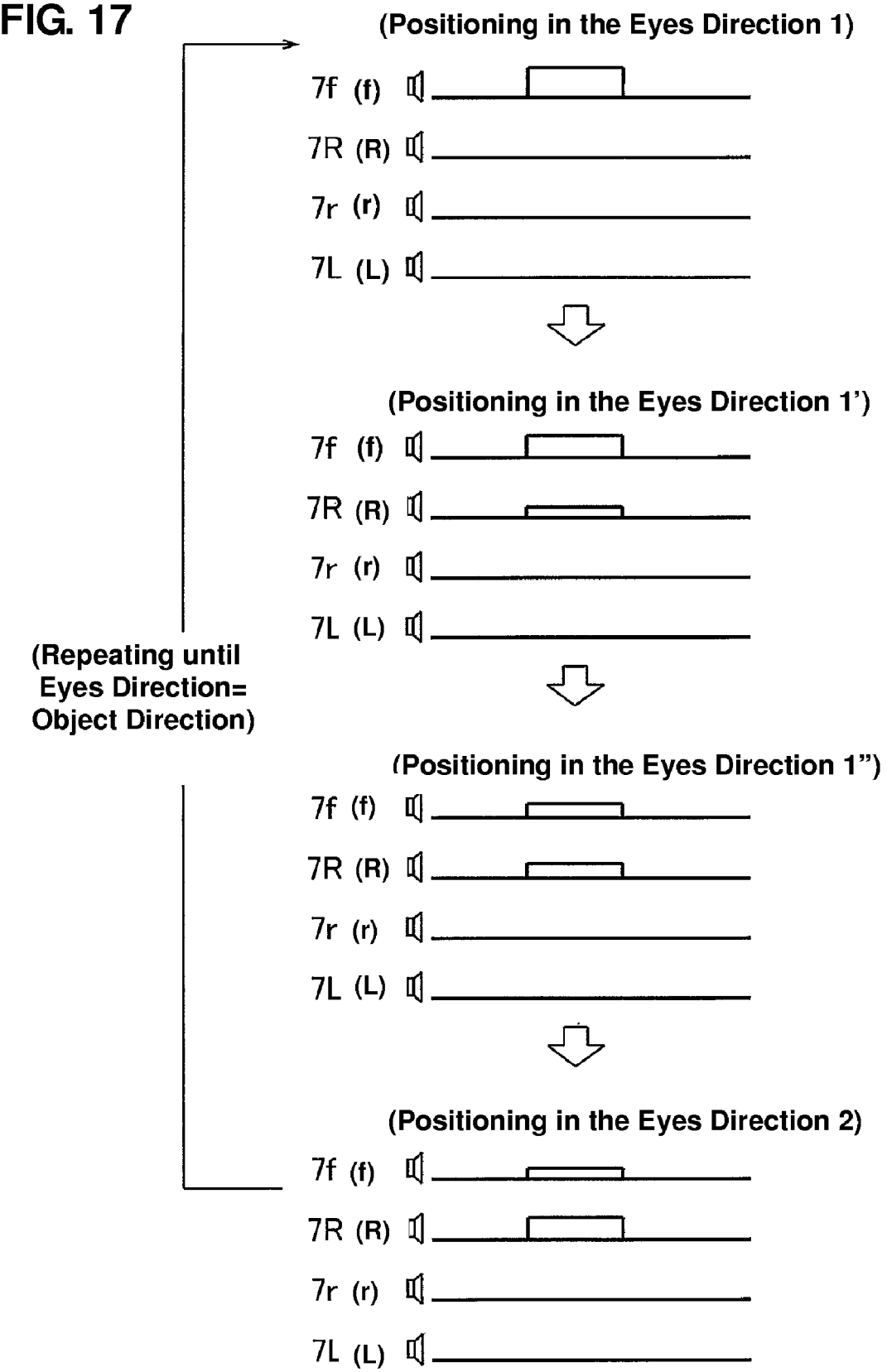
FIG. 17 is a diagram showing the speaker output state in case of the sound image positioning in the direction of "2" of FIG. 16.
Figure 18:
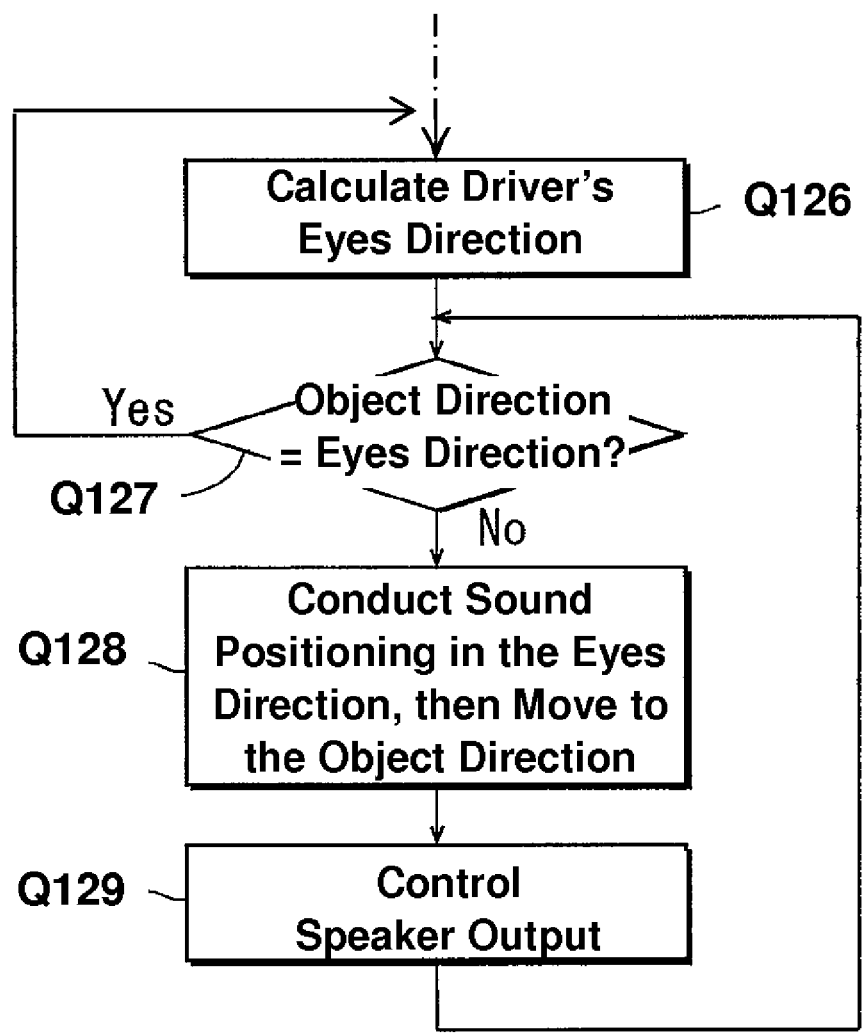
FIG. 18 is a flowchart showing a control example of the sixth embodiment.
Figure 19:
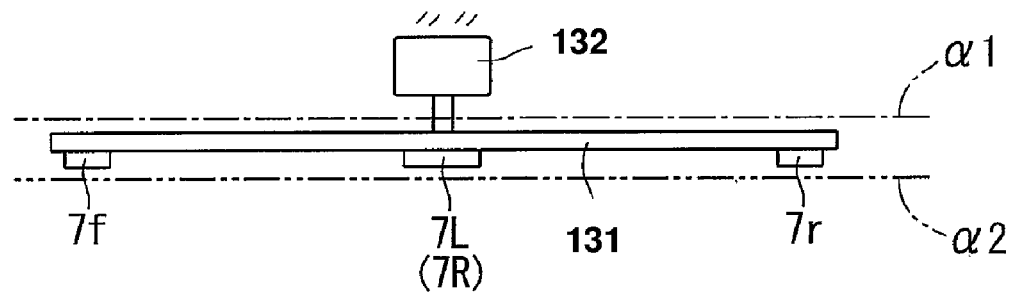
FIG. 19 is a side view of a major portion of an exemplified mechanism for rotating the speakers as a whole, keeping their relative positional relationships, according to a seventh embodiment of the present invention.
Figure 20:
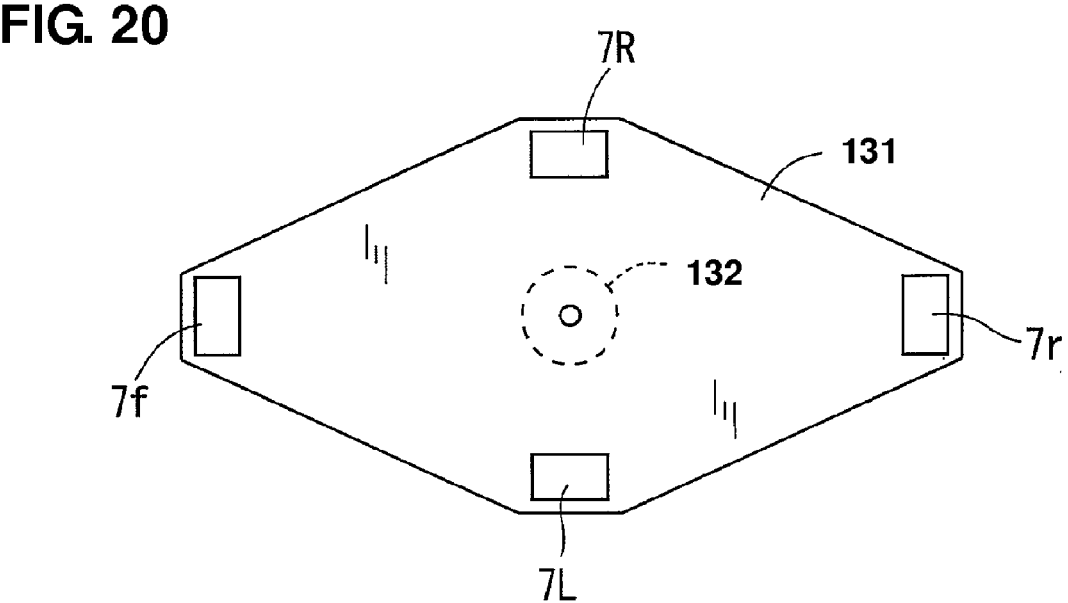
FIG. 20 is a bottom view of FIG. 19.

FIGS. 16 through 18 show a sixth embodiment of the present invention. In the present embodiment, the sensor 111 and the processing portion 138 of the controller U' of FIG. 14 are used as well. According to the present embodiment, the alarm using the sound-image positioning is not executed in case the direction of the driver's eyes is the same as the direction of the dangerous object existing. This is because the driver may recognize the dangerous object properly in this case. Meanwhile, in case the direction of the driver's eyes is different from the direction of the dangerous object existing, there is a concern that the driver may fail to recognize the dangerous object. Thus, the alarm using the sound-image positioning is executed in this case. Herein, while the sound image of the dangerous object may be positioned in the existing direction of the dangerous object immediately, the sound image is positioned in the driver's-eyes direction first and then the sound image is moved gradually so that the sound image is positioned in the direction of the dangerous object. Eventually, this positioning of the sound image in the direction of the dangerous object is fixed.

In FIG. 16, the forward driver's-eyes direction detected by the sensor 111 is denoted by the direction "1" and the front-right direction of the existing dangerous object is denoted by the direction "2." In this case, at first the sound-image positioning is conducted in the direction "1" (the alarm sound is emitted only or mainly from the front speaker 7f as shown in FIG. 17). Then, after a short time (e.g., 0.05-0.2 seconds) has passed, the sound-image positioning is conducted in the direction "1'" which is closer to the direction "2" than the direction "1" (the front speaker 7f and the right speaker 7R emit the alarm sounds, in which the sound volume from the front speaker 7f is greater than that from the right speaker 7R, as shown in FIG. 17).

Then, after a short time (e.g., 0.5-1 seconds) has passed, the sound-image positioning is conducted in the direction "1''" which is further closer to the direction "2" than the direction "1'" (the front speaker 7f and the right speaker 7R emit the alarm sounds, in which the sound volumes from the front speakers 7f, 7R are equal, as shown in FIG. 17). Subsequently, after a short time (e.g., 0.05-0.2 seconds) has further passed, the sound-image positioning is conducted in the direction "2" which is the final target (the sound volume from the right speaker 7R is greater than that from the front speaker 7f, as shown in FIG. 17). This emitting of the sound in this direction "2" continues until the direction of driver's eyes comes to this direction "2." After it is confirmed that the direction of driver's eyes has come to this direction "2" (or after a specified time has passed), the speakers 7 stop emitting any sound for the sound-image positioning or turn down the sound emitted.

An example of a specific control for moving the sound-image positioning described above will be described referring to FIG. 18. A flowchart of FIG. 18 shows only part of the features of this specific control. The driver's-eyes direction is calculated in step Q126 of this flowchart which may follow the processing step (corresponding to the step Q5 of FIG. 7 of the above-described first embodiment, for example) of detecting the existing direction of the dangerous object, for example. Then, in the next step Q127 it is determined whether or not the driver's-eyes direction is the same as the direction of the dangerous object existing. When this determination is Yes, the control proceeds returns because it may be considered that the driver sees and recognizes the object already (no alarm sound emitted).

When the determination of the step Q127 is No, the output sound volumes of the speakers 7 are set in step Q128 such that the sound-image positioning of the object is conducted in the driver's-eyes direction first and then the sound-image positioning is moved gradually so that the sound-image positioning can be conducted in the direction of the object which is the final target direction. In the next step Q129 the output control of the respective speakers 7 is executed based on the setting in the step Q128. Then, the control returns.

Embodiment 7

FIGS. 19 through 23 show a seventh embodiment of the present invention. The processing portion 139 and the actuator 140 of FIG. 14 are used in the present embodiment. According to the present embodiment, the four speakers 7 are fixed to a lower face of a holding member 131 which is of a thin plate shape. The holding member 131 can be driven by the actuator 132, such as a motor, which is fixed to the vehicle roof so as to rotate around a vertical axis. The holding member 131 may be disposed below a roof trim shown by a one-dotted broken line α1, or above a roof trim shown by a two-dotted broken line α2 of FIG. 19. In any case, the actuator 132 is disposed above the roof trims α1, α2. Herein, the actuator 132 may be fixed to the roof trims α1, α2 in case these roof trims have a sufficient rigidity for supporting the actuator 132.

According to the present embodiment, the rotational position of the holding member 131 is changed according to the change of the direction of the driver's head D so that the front speaker 7f can be always positioned right in front of the driver's head D (the left speaker 7L can be positioned right beside a driver's left ear, and the right speaker 7R can be positioned right beside a driver's right ear). Herein, the above-described sensor 111 which detects the driver's-eyes direction is preferably used as this sensor to detect the direction of the driver's head D (in particular, in case the sensor 111 is the camera), but this sensor may be comprised of another different sensor which is provided additionally. In the present embodiment, the driver's-eyes direction detected by the sensor 111 is set to be the direction of the driver's head D as well.

Figure 21:
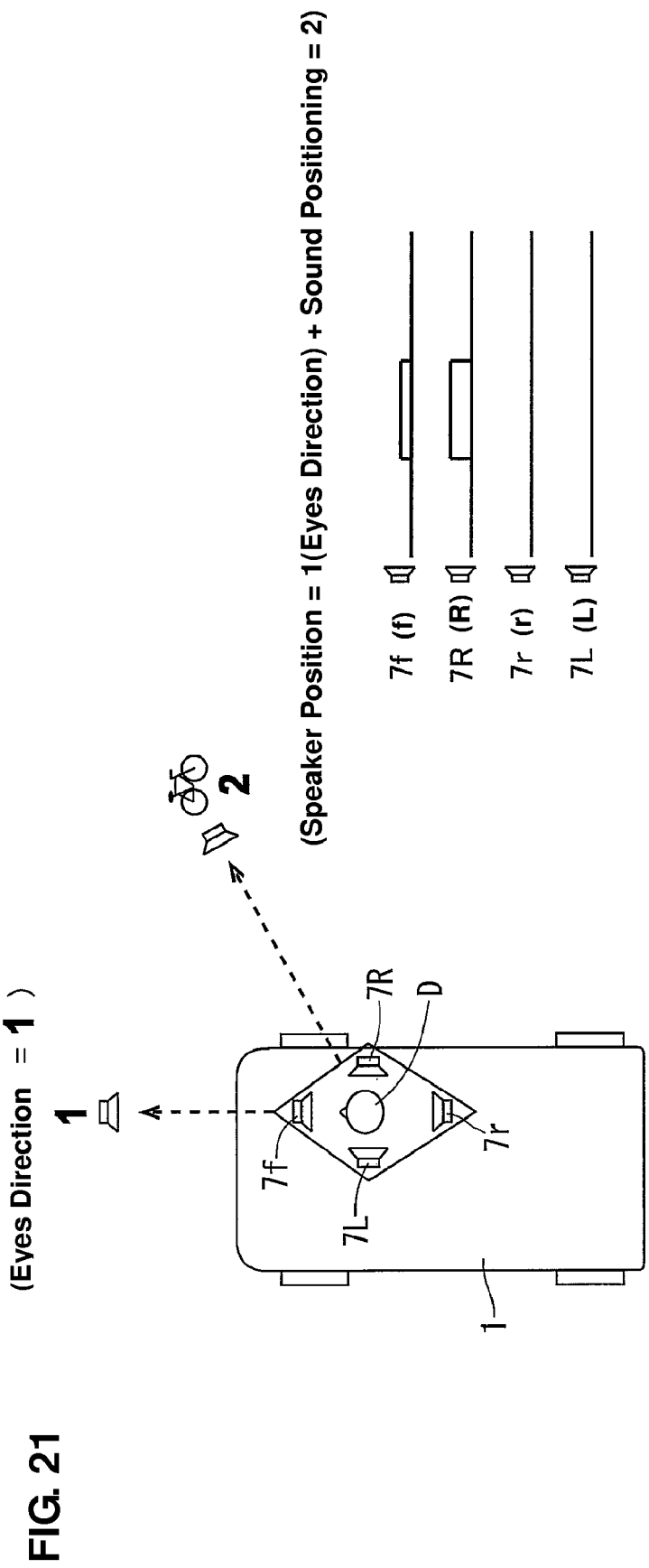
FIG. 21 is a diagram showing the speaker output state for the sound image positioning according to the seventh embodiment.

FIG. 21 shows a state in which the driver's head D (the driver's-eyes) is directed right forward and thereby the front speaker 7f is positioned right in front of the driver's head D as well. Herein, this case shown in FIG. 21 shows a situation where the dangerous object exits in the direction "2." Accordingly, the front speaker 7f emits the alarm sound with a smaller sound volume, while the right speaker 7R emits the alarm sound with a greater sound volume, so that the sound image can be positioned in the direction "2."

Figure 22:
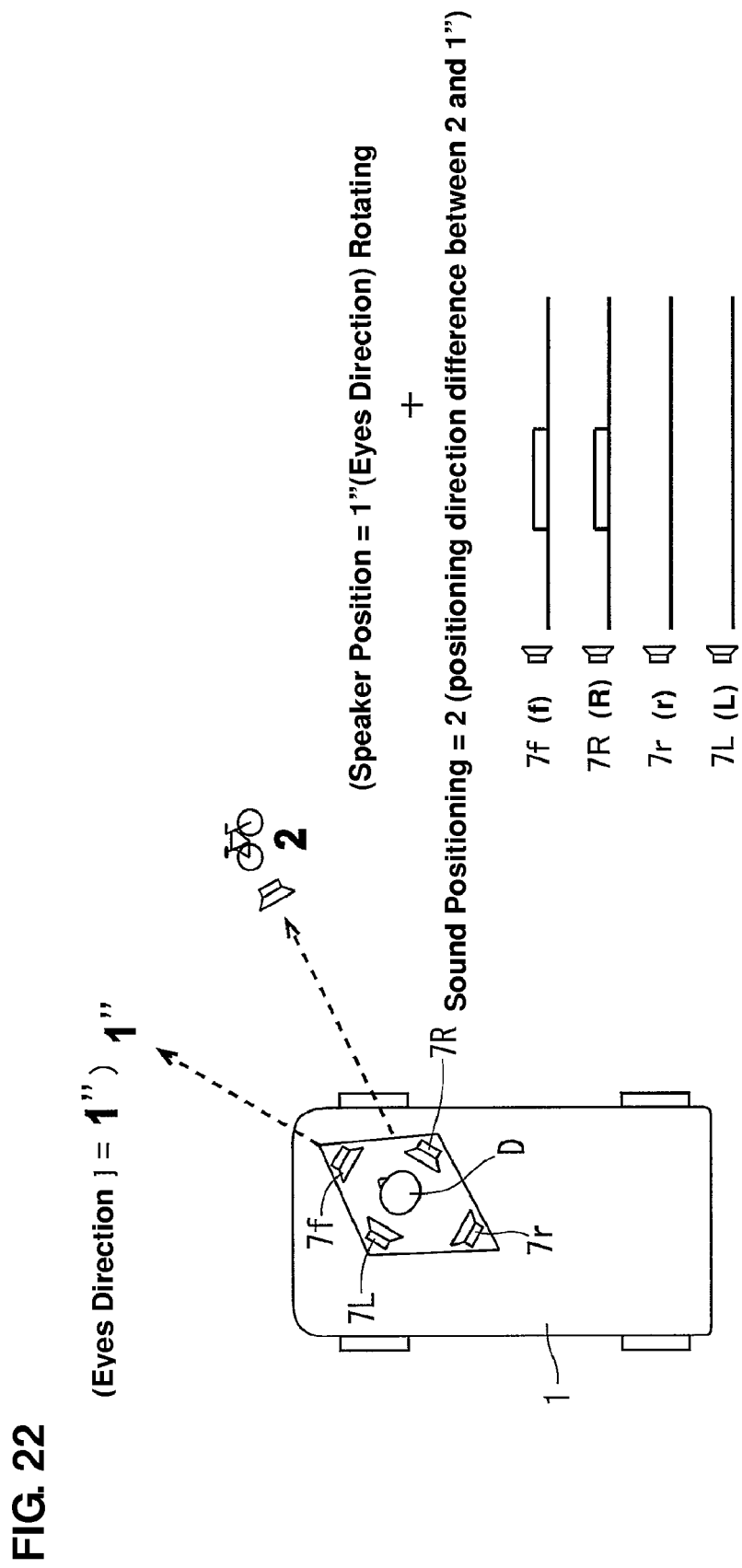
FIG. 22 is a diagram showing the speaker output state for the sound image positioning in case the direction of the driver's head is different from that shown in FIG. 21.

Meanwhile, FIG. 22 shows a state in which the driver's head D (the driver's-eyes) is directed toward the front right and thereby the position of the speakers 7 is changed by the actuator 132 rotating the holding member 131 so that the front speaker 7f can be positioned right in front of the driver's head D. In this case, the front speakers 7f and the right speaker 7R emit the alarm sounds with the same sound volume respectively so that the sound image can be positioned in the direction "2" because the above-described position change of the speakers 7 is considered.

According to the present embodiment, since the positional relationships of the speakers 7 relative to the driver's head D is kept despite the change of the direction of the driver's head D, the positioning of the sound image can be achieved precisely, thereby making the driver recognize the direction of the dangerous alarm properly.

Figure 23:
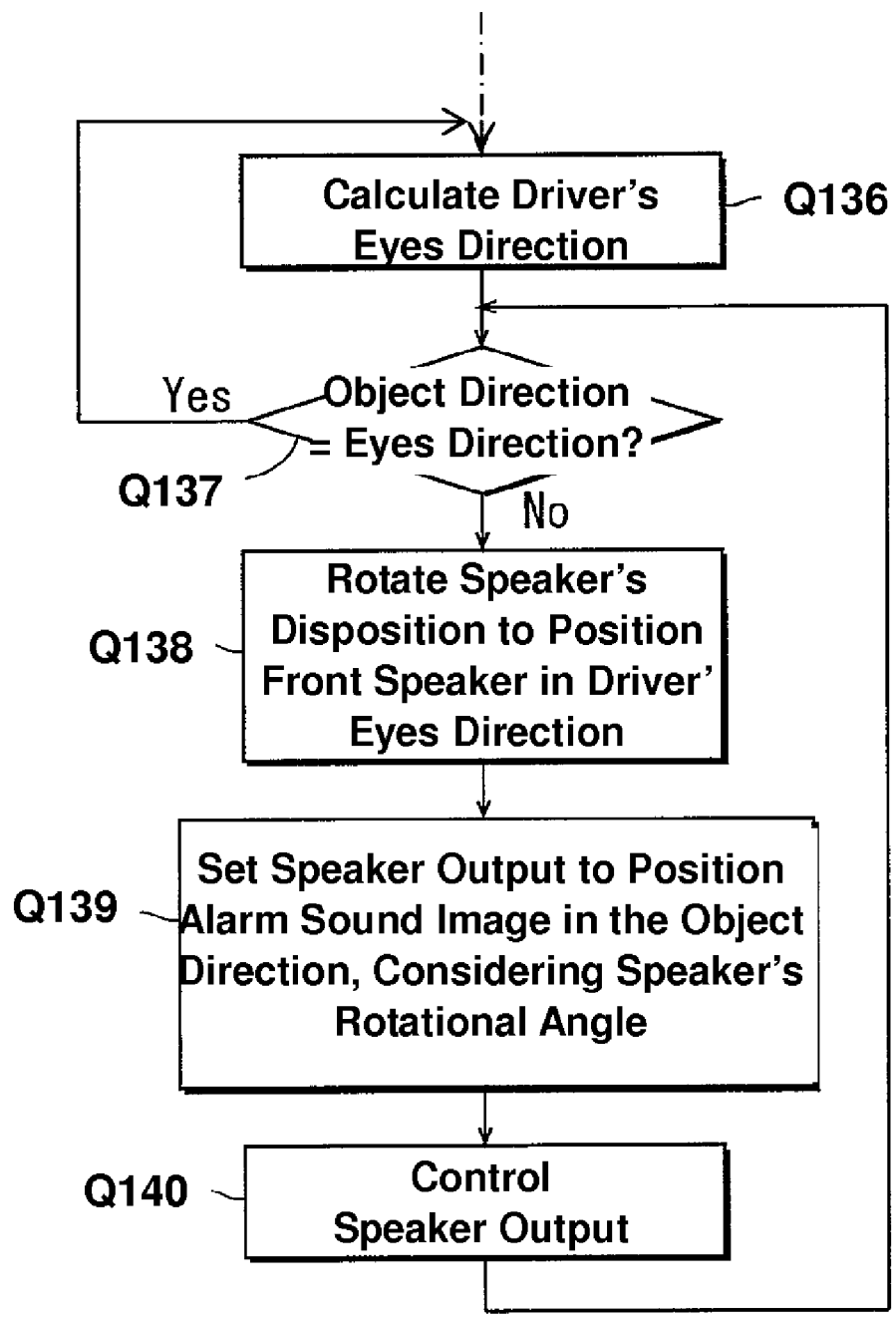
FIG. 23 is a flowchart showing a control example of the seventh embodiment.

FIG. 23 shows a control flowchart of the controller U' which performs the above-described control according to the present embodiment. This flowchart of FIG. 23 shows only part of the features of the present embodiment. The driver's-eyes direction is calculated in step Q136. In the next step Q137 it is determined whether the driver's-eyes direction is the same as the direction of the dangerous object existing or not. When the determination of the step Q137 is No, the holding member 131 is rotated so that the front speaker 7f can be positioned right in front of the driver's head D (in the direction of the driver's eyes) in step Q138. In the next step Q139 the output of the respective speakers 7 is set so that the sound image of the alarm sound can be positioned in the direction of the dangerous object. Herein, the output of the speakers 7 is properly set considering the rotation of the holding member 131 (the sound-image positioning direction is the same in the cases shown in FIGS. 21 and 22, but the output from the speakers 7f, 7R is different in these cases). In the next step Q140 the output control of the respective speakers 7 is executed based on the setting in the step Q139.

The present invention should not be limited to the above-described embodiments, and any other modifications and improvements may be applied within the scope of a spirit of the present invention.

What is claimed is:

1. A driving assist device for a vehicle which is equipped with plural speakers for a driver, comprising:
   an object detecting means to detect an object existing around the vehicle;
   a danger-degree detecting means to detect a degree of danger of collision or contact of the object detected by said object detecting means with the vehicle;
   a direction detecting means to detect a direction of the object which has a critical state in the degree of danger of collision or contact with the vehicle which is detected by said danger-degree detecting means;
   a distance detecting means to detect a distance of the object existing around the vehicle from the vehicle;
   an alarm-sound creating means to create an alarm sound according to the distance of the object which is detected by said distance detecting means and the direction of the object which is detected by said direction detecting means;
   a reference sound creating means to create a reference sound which enables the driver to recognize the distance of the detected object from the vehicle when the driver hears the alarm sound created by said alarm-sound creating means, comparing with the reference sound; and
   a sound generating means to generate the alarm sound created by said alarm-sound creating means and the reference sound created by said reference sound creating means at the same time or a different timing via the speakers for the driver.

2. The driving assist device for a vehicle of claim 1, wherein said reference sound creating means creates the reference sound based on a sound of a sound source which is located between the driver and the object.

3. The driving assist device for a vehicle of claim 2, wherein said reference sound creating means creates a first reference sound based on the sound of the sound source which is located between the driver and the object, and a second reference sound based on a sound of another sound source which is located in the direction of the object and at a farther position than the object, and said sound generating means generates the alarm sound and the first and second reference sounds.

4. The driving assist device for a vehicle of claim 3, wherein the first reference sound and the second reference sound are generated by said sound generating means at a different timing from each other.

5. The driving assist device for a vehicle of claim 1, wherein a sound volume of the reference sound changes according to at least one of the distance of the object from the vehicle and the alarm sound.

6. The driving assist device for a vehicle of claim 1, wherein the reference sound has directional information which shows the direction of the object.

7. The driving assist device for a vehicle of claim 1, wherein the reference sound is created as a road-ambience sound which is stored previously or obtained through a microphone.

8. The driving assist device for a vehicle of claim 7, wherein the reference sound is a composite sound which is obtained through combination of a specified reference sound and the road-ambience sound.

9. The driving assist device for a vehicle of claim 1, wherein a sound volume of the reference sound is lower than that of the alarm sound.

10. The driving assist device for a vehicle of claim 1, wherein said plural speakers comprise a pair of right and left speakers and a pair of front and rear speakers, the pair of right and left speakers being disposed on the right and on the left symmetrically relative to a driver's head with a forward-directed driver's eyes in a plan view, the pair of front and rear speakers being disposed in front and in back symmetrically relative to the driver's head with the forward-directed driver's eyes in the plan view, and said sound generating means generates the alarm sound via said pairs of speakers so that a sound image of the object is positioned in said direction of the object detected by said direction detecting means.

11. The driving assist device for a vehicle of claim 10, further comprising a driver's-eyes-direction detecting means to detect a direction of a driver's eyes, wherein when the driver's-eyes direction detected by said driver's-eyes-direction detecting means is different from the direction of the object detected by said direction detecting means, said sound generating means generates the alarm sound via the pairs of speakers so that the sound image of the object is positioned in the driver's-eyes direction first and then the sound image of the object is moved gradually so that the sound image of the object is positioned in the direction of the object detected by the direction detecting means.

12. The driving assist device for a vehicle of claim 10, further comprising a driver's-eyes-direction detecting means to detect a direction of a driver's eyes, wherein when the driver's-eyes direction detected by said driver's-eyes-direction detecting means is different from the direction of the object detected by said direction detecting means, said sound generating means generates the alarm sound via the pairs of speakers so that the sound image of the object is positioned in the direction of the object detected by the direction detecting means, while when the driver's-eyes direction is the same as the direction of the object, the sound generating means stops generating the alarm sound or turns down the alarm sound generated.

13. The driving assist device for a vehicle of claim 10, further comprising a driver's-head-direction detecting means to detect a direction of a driver's head, and a rotating means to rotate said speakers around the driver's head in the plan view, keeping relative positional relationships of the speakers, wherein the rotating means rotates the speakers so that said front speaker is positioned right in front of the driver's head detected by said driver's-head-direction detecting means.

14. The driving assist device for a vehicle of claim 10, wherein said plural speakers are a non-directional type of flat speaker which is provided at a roof of the vehicle.

* * * * *